(12) United States Patent
Ivory

(10) Patent No.: US 6,608,817 B1
(45) Date of Patent: Aug. 19, 2003

(54) METHOD AND APPARATUS FOR CONNECTION-ORIENTED MULTIPLEXING AND SWITCHING NETWORK ANALYSIS, MANAGEMENT, AND TROUBLESHOOTING

(75) Inventor: Christopher Joseph Ivory, Glen Rock, NJ (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/473,149

(22) Filed: Dec. 28, 1999

(51) Int. Cl.⁷ ............................................. H04L 12/26
(52) U.S. Cl. ...................................... 370/250; 345/629
(58) Field of Search ................................ 370/229, 230, 370/235, 241, 241.1, 248, 249, 250, 252, 395.1, 489; 345/440, 440.1, 629, 630, 641

(56) References Cited

U.S. PATENT DOCUMENTS

| | | | |
|---|---|---|---|
| 5,596,703 A | * 1/1997 | Eick et al. .................. | 345/700 |
| 5,826,014 A | 10/1998 | Coley et al. ........... | 395/187.01 |
| 5,898,830 A | 4/1999 | Wesinger, Jr. et al. .. | 395/187.01 |
| 6,052,788 A | 4/2000 | Wesinger, Jr. et al. ...... | 713/201 |
| 6,061,798 A | 5/2000 | Coley et al. ................ | 713/201 |
| 6,320,585 B1 | * 11/2001 | Engel et al. ................ | 345/440 |
| 6,538,993 B1 | * 3/2003 | Itoh ........................... | 370/230 |

OTHER PUBLICATIONS

Network Associates, "Sniffer ProHigh–Speed ATM Book", I–TNV–ATM–001, 2 pages.
Network Associates, Sniffer Pro: ATM Installation, Connection, and Configuration Guide, Release 2.5, 12/98, 37 pages.
Network Associates, Sniffer Pro® Getting Started Guide, Release, 2.5, 12/98, 110 Pages.

* cited by examiner

Primary Examiner—Kwang Bin Yao
(74) Attorney, Agent, or Firm—Silicon Valley IP Group; Kevin J. Zilka; Christopher J. Hamaty

(57) ABSTRACT

A method for analyzing a connection oriented multiplexing and switching network (COMSN), includes dividing a subsection of a COMSN network into a plurality of virtual channel characterization (VCC) layers, extracting frames from the subsection when the frames are available over a period of time in each of the plurality of VCC layers, and selectively displaying objects associated with the frames and the relationships between the objects.

41 Claims, 27 Drawing Sheets

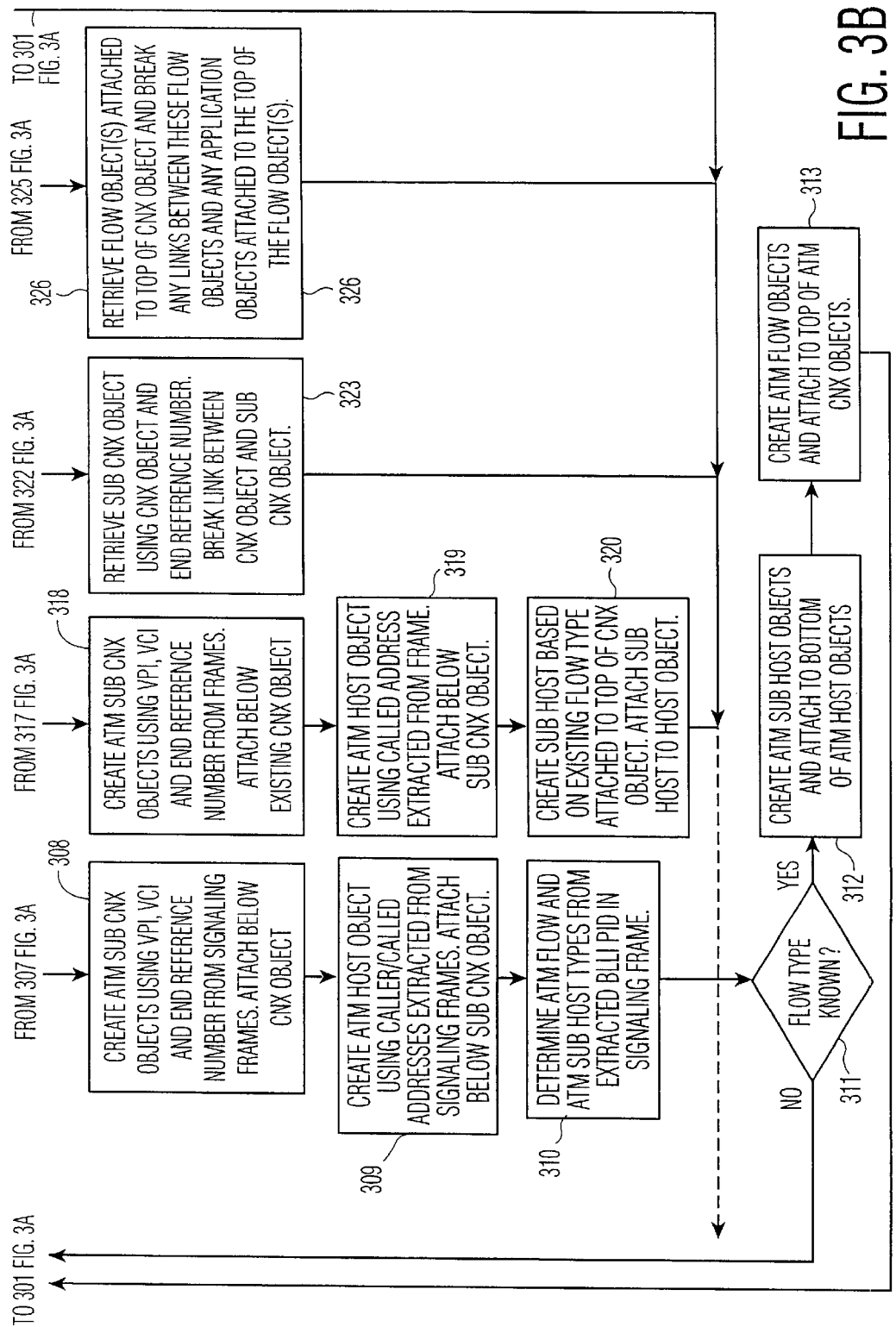

METHOD AND APPARATUS FOR CONNECTION-ORIENTED MULTIPLEXING AND SWITCHING NETWORK ANALYSIS, MANAGEMENT, AND TROUBLESHOOTING

FIELD OF THE INVENTION

The present invention relates generally to methods and apparatus for providing network troubleshooting tools for detecting, diagnosing, and repairing network failures, and more particularly is related to the expansion and improvement of such methods and apparatus for use in association with high-speed connection-oriented multiplexing and switching networks, including Asynchronous Transfer Mode (ATM) networks.

BACKGROUND OF THE INVENTION

Many different types of networks have been developed for permitting computers to communicate with each other in an organized manner. One such network for use within the same building by a plurality of computer users is known as a local area network (LAN). After the development of LAN networks, network systems were further developed for permitting computer users over a wide area, such as those located in a large industrial site, to communicate over a wide area network (WAN). As these networks have grown in size and complexity, it became increasingly difficult to troubleshoot, maintain, and optimize the performance of such networks, particularly wide area networks.

With the invention of the World Wide Web (WWW); and the associated Internet, the complexities of maintaining such world wide advanced data communications far exceed the complexities of the largest WAN systems or networks. To improve communication over the Web or Internet, the ATM system was developed for providing technology for simultaneously transmitting data, voice and video traffic, and information over high band width circuits. An ATM system network is one example of a high-speed connection-oriented multiplexing and switching network developed for the WWW. In the prior art, hardware has been developed for ATM systems, in conjunction with associated software platforms, to form a communications architecture based on the switching and relaying of small units of data, typically called "cells". These "cells" may also be grouped into frames or "packets". ATM systems or networks incorporate technology that advances the state-of-the-art to include a protocol structure for effectively integrating voice, data, and video over the same communications channel at virtually any speed. Other known services for providing data communication, such as the Internet, Internet protocol (IP), frame relay, Switched Multimegabit Data Service (SMDS), and Ethernet, cannot provide the aforesaid integration of voice, data, and video over the same communications channels, as provided by ATM-based services.

In other words, an ATM network consists of configurable networks between source devices and destination devices, with the network being formed by switches interconnected by links. Typically, cells of data which are 53 bytes in length, also grouped as packets, are routed by the switches. A virtual circuit (VC) is established between source devices and destination devices, and the cells or packets are routed across these virtual circuits. One or a plurality of links and switches typically comprise a virtual circuit. Note that a plurality of virtual circuits can be routed across a single link, the latter not being dedicated to any single virtual circuit.

Network Associates, Inc., of Santa Clara, Calif., has been in the forefront of technology for many years in developing and providing software for managing and trouble-shooting computer networks. The software is known as Sniffer Software. The most recent Sniffer systems or software readily permit LAN and WAN networks to be rapidly trouble-shooted for resolving problems in the associated network that are interfering with user communication within the network. Network Associates, Inc. (hereinafter NAI), has developed a Sniffer Enterprise Expert System, that provides for the rapid detection, diagnosis, and repair of network failures. NAI regularly publishes technical white papers on its public web site at http://www.nai.com/asp set/buy try/try/whitepapers.asp that can be selected. Page down to the section Sniffer Total Network Visibility for a listing of associated papers. Certain of these papers may be of interest relative to the present invention, and are incorporated herein as of the date of filing this Application, to the extent they do not conflict herewith.

For the purposes of this invention, a frame is a known data stream that contains a header, a trailer, and data of some type in between the header and the trailer. The combination of the header and the trailer, per frame, specifies the overall length of the frame, including the contents made up of the header and the trailer, as well as the type of data that resides between the header and the trailer within the frame. An ATM Sniffer is a newly introduced product of Network Associates, Inc. that permits a user to extract full duplex or bidirectional individual and successive frames that are being communicated between an ATM host device or switch, and an ATM network to which a number of user devices may be connected. Note that the Sniffer product simply is connected to a subsection of an ATM network, and it is not necessarily extracting frames that are being outputted by host device (s), but frames that are being communicated over a given network path between a number of devices. Note that for the purposes of this Application, connection to an ATM network means connection to a subsection of the network. These devices are ATM devices. Note that an ATM host device can be an individual personal computer (PC) that has a special card installed in it to permit it to interface with an ATM network for the purposes of communicating data. Also, an ATM edge device is a type of server device that permits an ATM network to be connected through the device to a number of work stations, for example, or other computer devices connected into a network that is connected to the server or edge device. Note that there are a plurality of different types of ATM frames, and the present invention can be utilized with any particular type of frame through appropriate design of the software.

A problem in the prior art using the present NAI Sniffer system or product, for example for monitoring an ATM network subsection, is that each ATM related frame must be reviewed individually in order to determine, during troubleshooting, why a particular device is not able to communicate with another device through the ATM network. The present inventor recognized that this is a critical problem, and requires a great deal of time for a user to determine where the problem exists in preventing the communication between devices. Note that Network Associates, Inc, (hereinafter NAI) has been marketing for about 7 years a software system known as "Sniffer Expert System" for local area network analysis, and for wide area network analysis, but not for ATM. The present ATM Sniffer Expert System invention permits a user to have the system itself analyze all of the ATM frames extracted by the Sniffer, and to extract from the frames the objects that are involved, such as individual devices, connections, applications, and so forth. The present Expert System, from the data extracted and the various objects that are involved, then analyzes the same and presents information for describing reasons why there may not have been communication between the objects, or that there has been a failure in a data transfer between objects. For example, the present Expert System may tell the user that a particular host was unreachable, and that is why the data was unable to be transferred to that host. Also, the present Expert System may indicate that a required time for transmission of data was exceeded, and for that reason data was not transferred. Other descriptions of problems may also be provided by the Expert System.

In an earlier stage of development, the present inventor expanded the Expert System to permit it to extract very narrow ATM information, such as the identification of a LAN, or edge device, where the ATM headers and trailers of the frames are stripped off and just the relevant LAN protocol encrypted frame (Ethernet, IEEE 802.3 or 802.5 encoded frames) of the associated device is provided and permitted to be used by the standard LAN Expert System in performing a very crude analysis of events in the ATM system. This development permitted ATM Encapsulated LAN type data to be extracted from the ATM frame and communicated to the present LAN Expert System of NAI for permitting the associated frames to be analyzed by the LAN Expert System. The frames that are so transferred are known as "encapsulated frames", and in effect are allowing the Expert System to analyze the frames as if they were all originated in a LAN type network, even though they may have been associated with an ATM network that is far beyond the distances involved between devices in a LAN network. However, such use of the encapsulated frames is very limited, and permits only a very limited type of analysis, virtually only permitting a user to know that a particular frame has not been communicated between certain devices. No other meaningful information can typically be extracted at the ATM level. The Expert System so expanded can provide certain statistics, but is not capable of providing close correlation between the types of devices that are interacting between one another with reference to the ATM frames that are being transferred.

SUMMARY OF THE INVENTION

The purpose of the present invention is to provide an ATM capability to the existing Sniffer Expert System of NAI (capable of retrieving and analyzing LAN/WAN frames) through the addition of software for dealing with ATM networks. As previously mentioned, ATM networks are worldwide networks in the extreme for permitting devices to operate though the ATM network that are located at very distant locations, such as different countries, for example. The present invention permits very detailed analysis of the frames derived from the ATM network of virtual circuits (VC), including identifying all of the hosts, and connections for all of the various types of entities, known broadly as objects, which include the hosts, connections, flows, and so forth in a subsection of the ATM network. Note that through use of modified programming, the present invention can be applied for use with connection-oriented multiplexing and switching networks other than ATM.

Currently there are four main areas that the ATM Expert supports, the signaling protocols (Q.2931), the LAN emulation (LANE) protocols, the Multi-Protocol Over ATM (MPOA) protocols, and multiplexed frames under the guise of RFC 1483 specification support. As more and more protocols become known under ATM, ATM Expert support will be expanded by NAI. The current model may also be expanded to include those as needed. The model itself is currently generic enough to handle the cases just mentioned, and future cases.

The present invention is representative of a relational database in order to accomplish the previous mentioned aspects of the invention. The invention creates a logical representation of an ATM model which identifies key ATM specific objects extracted and further synthesized from an ATM data stream, and identifies the relationships and connections between these key objects in a higher form. In effect, a relational database is created. An object, in this case, is meant to be a database representation of an ATM end point (host), a connection between end points Flow or Flows detected on the connection, and an Application which correlates multiple Flows to a common ATM host or end point. An ATM system consists of quite a number of parts, including host objects, which can be a device that is used to gain entry into the ATM system, and connections between these host objects. Data flows can also be included that are associated with or carried on the connections. What is required is to extract, or synthesize, these various entities or objects from the data stream, create a small database that represents each of these objects, and to create the relationships between these database objects. These objects-in turn are displayed in hierarchical form in the Sniffer product of the present invention, so that a user who is trying to analyze various aspects of the ATM network can see which host objects are detected, what connections are seen in this data stream, what the relationships are between these connections and host objects, what data flows, or control flows, that is binary flows are actually flowing between these host objects across these connections, and with the highest of the application layers how many of these flows and what types of flows are originating or terminating at a particular host object, referred to as a client. To accomplish these features the inventor has generally divided an ATM network into a plurality of virtual channel characterization layers or levels, interconnecting hosts. Programming permits users to "click" on an Application layer to go into the underlying virtual characterization layers which correlate to the same ATM host acting as a client, for example.

BRIEF DESCRIPTION OF THE DRAWINGS

Various embodiments of the present invention are described in detail with reference to the drawings, in which like items are identified by the same reference designation, wherein:

FIGS. 3A and 3B are flowcharts showing the processing of ATM Q.2931 signaling frames for the present ATM Expert Model Synthesis.

DETAILED DESCRIPTION OF THE INVENTION

Figure 1:
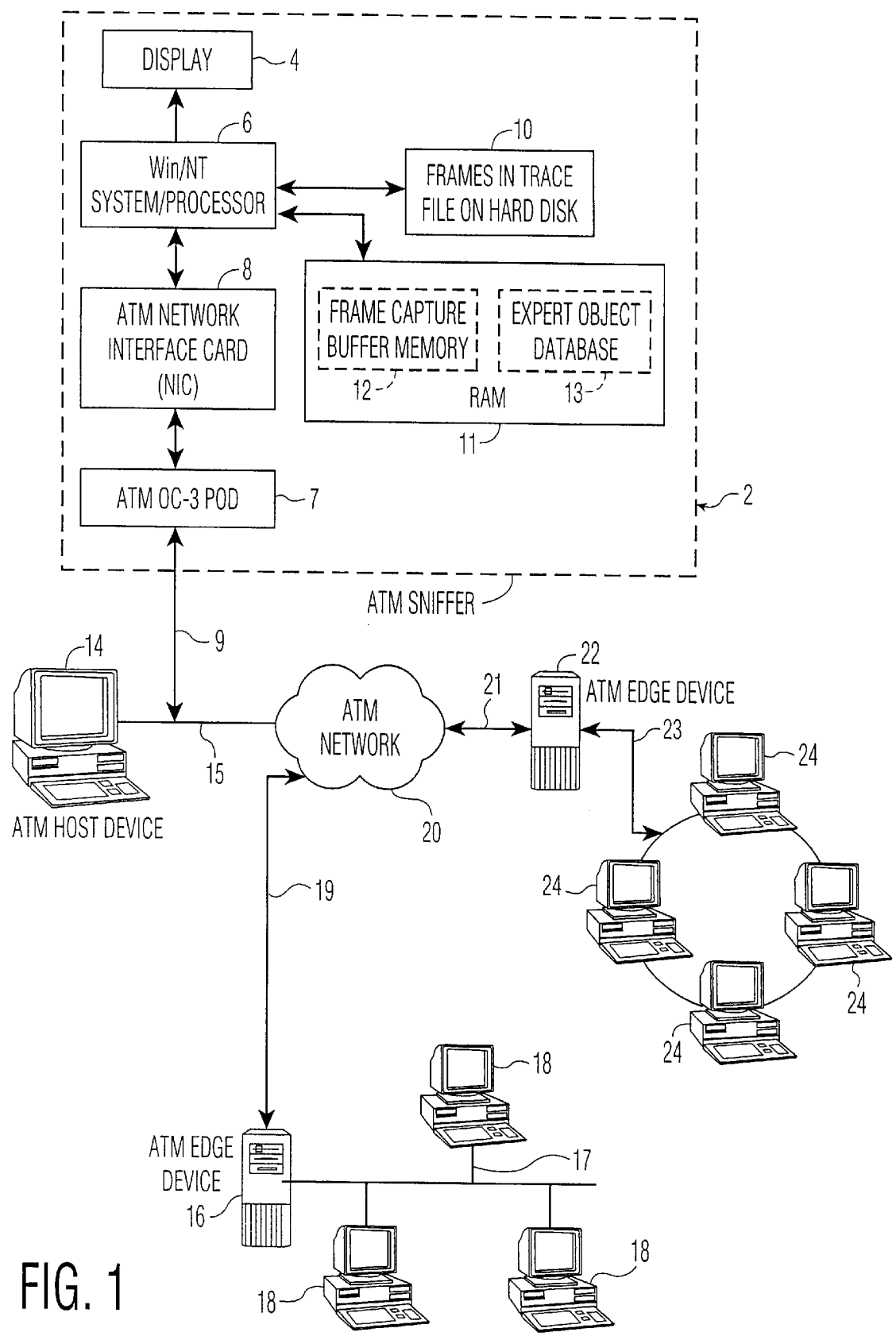
FIG. 1 shows a block schematic diagram of one embodiment of the present invention, as connected to an ATM network.

In FIG. 1, an ATM Sniffer Expert System 2 includes a display 4 for receiving signals from a WinNT System/Processor 6, the latter also being connected to bidirectionally transfer frames in a trace file on a hard disk 10, a frame capture buffer memory 12, and an ATM network interface card (NIC) 8. As would be known to one of skill in the art, except for the display 4, and the hard disk 10, the WinNT System/Processor 6, the NIC 8, and the frame capture buffer memory 12, all can be provided on printed circuit plug in cards. A more detailed discussion of the ATM Sniffer Expert System 2 is given below.

The present inventor built a portable ATM Sniffer Expert system 2 using components or modules now available from NAI. A Dolch Pentium II PC (PAC 65), NAI part No. NGCP165-NA-100 provided display 4, processor 6, and hard disk 10. A 128 mb RAM upgrade for the Dolch, NAI part No. NGC-PIPM-NA128, for RAM memory 11. An ATM ZN SAR Card, NAI part No. NIC-ATMS-NA-100, provided NIC Card 8. An ATM MMF OC-3 Pod and cable, NAI Part No. POD-AMMF-NA-100, provided Pod 7, was required. Lastly, Sniffer Pro High Speed Software (app), NAI Part No. SAS-DRCT-NA-600-SI was loaded into the hard disk 10 (a license is required from NAI). Note that the ATM OC3-Pod, in this prototype example, provides the electrical signaling to optical signaling conversion between NIC 8 and the ATM network 20, the latter using an optical carrier or signal.

Figure 2:
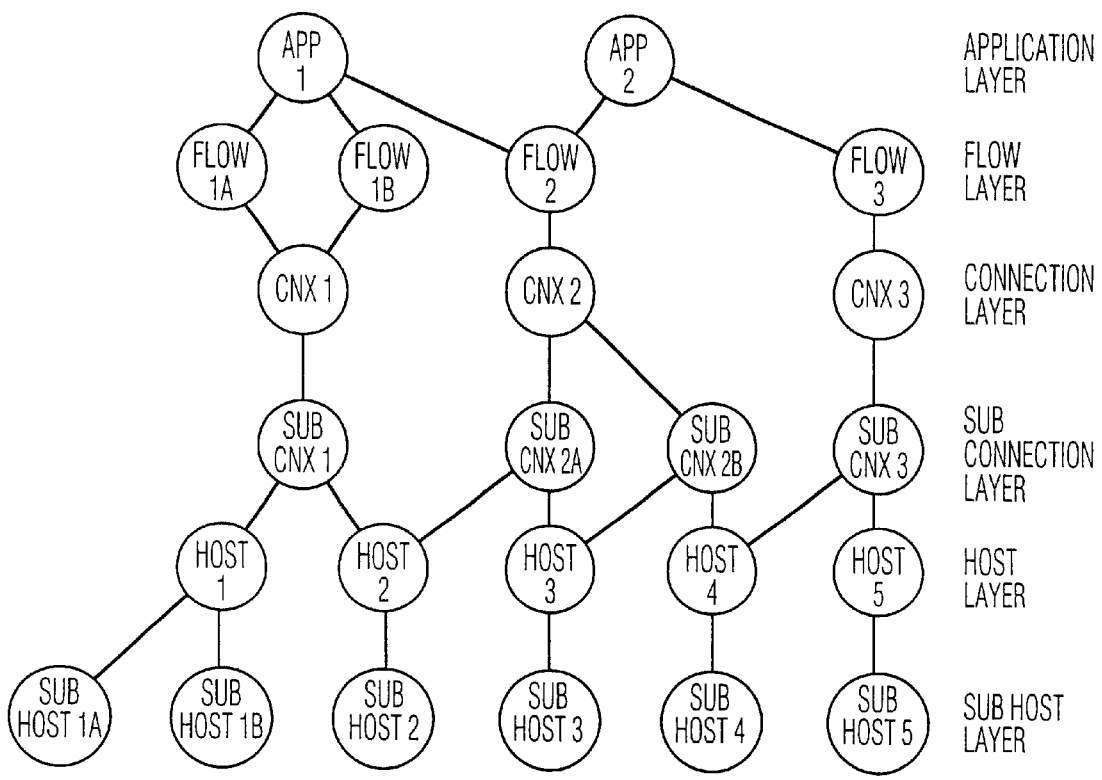
FIG. 2 is a diagram showing an ATM Expert Model of one embodiment of the present invention.

In FIG. 2, an ATM Expert Model for one embodiment of the invention is shown. In developing this ATM Expert Model, the inventor applied different rules for each layer of the Model, with each layer itself being an object or virtual channel characterization layer. With further reference to FIG. 2, each Application layer object represents an ATM client or server, and may not always be present. Attachments between the Application Layer and the underlying Flow Layer represent those flows (data paths) which feed or are fed by the client or server by the bidirectional flow of data. The Application Layer is typically used to hold statistical data or information relating to all attached Flow Objects, and 0 to n Flow Objects may be attached.

Each Flow Layer object represents a specific and distinct ATM data stream found on an ATM Connection and may not always be present. A flow can have "0" to n attachments to the Application Layer with "0" representing the case where no Application (client or server) object has been identified even though the flow object exists, "1" representing the case where an Application (client or server) object is attached but the client or server on the other side of the flow is unknown; "2" representing the case when the flow is attached between two known Application objects; and "n" representing the case where the flow object is overlaid on a point to multipoint connection with one known Application Object feeding n known Application objects. Each flow may only be associated with exactly one Connection Layer object beneath it. As previously indicated, the flow objects are used to hold statistics of data flow detected on a connection.

Each Connection layer object represents a specific and distinct connection, which spans two ATM Host entities (point-to-point calls), or more (point-to-multipoint calls). There is exactly one connection for each implicit call (presence of data on a channel) or explicit call (connection signaled by ATM host entity to create a channel between itself and another ATM Host). A Connection object may support 1 to n high layer Flow Objects with "1" representing the case of a nonmultiplexed (i.e. single data flow type) and n representing the case where n distinct data flow types are present on the channel with each type uniquely identified (multiplexed connection). There must be 1 to n Sub Connection layer objects attached below the Connection Layer. A single Sub Connection layer object attached to a Connection object represents a point-to-point connection/call between two ATM Host Objects, whereas a multiple number of attached Sub Connection Objects represents a point to multiple call where a single ATM Host object broadcasts information to n attached ATM Hosts objects. The Connection Layer is used to hold statistics of all data detected on the connection or call between the attached ATM hosts.

Each Sub Connection Layer object represents the binding of two ATM Host objects to a given Connection Layer object. There is exactly one Sub Connection object per ATM Host pair, and each Sub Connection Layer object must only be attached to a single Connection Layer object. There can be many Sub Connection objects attached to the same Connection Layer object (point to multipoint call) with each Sub Connection object uniquely identified. For each Connection Layer object there must exist at least one Sub Connection layer object. The Sub Connection Layer is used to hold statistics of all data, which passed between two hosts on a point-to-point connection or the "root" host and a single "leaf host on a point-to-multipoint (party) connection.

Each Host Layer object represents an ATM Host or end station. A Host Layer object may have 0 to n Sub Connection Layer objects attached to it with zero representing the case when the Host object is created, but no calls are associated with the object. A Host Layer object may have 0 to n Sub-Host layer objects attached to it with 0 representing the case where the host type entity is generic or unknown, and n representing the case where many unique Sub-Host entities share the same Host objects address or key (multiplexed host case). The Host Layer is used to hold statistics or data, which was received by or transmitted by this host.

Each Sub-Host Layer object represents a specific ATM Host entity associated with the ATM Host key/address. There can be many Sub-Host Layer objects sharing a single Host Layer object that is a Host with multiple functions, but there can be only one Host Layer object associated with each Sub-Host Layer object. Each associated Sub-Host associated with the same Host Layer object must be unique i.e. cannot have the same function as any other attached Sub-Host layer object.

As previously mentioned, FIG. 2 shows an "ATM Expert Model", as an example of various layers that may be involved. The way the Expert Model is built up, starts at the Connection Layer, which is in the center of the model. The connections are either discovered by the presence of data where there was none before on a particular channel (implicit connections), or the connections are the result of set-up messages that go over the signaling channel that have been successful (explicit connections). Note that the signaling channel is typically channel 0.5 and will process frames which contain ATM addresses, similar to telephone numbers, twenty byte addresses of a calling party toward a called party are typical items, for setting up the connection there between. Those addresses represent ATM end points or ATM hosts. The connections are the first items to be detected. A connection created by the signaling channel is referred to as an SVC connection. There are two types of connections, the SVC (switched virtual circuit, which actually uses the set-up designated on the separate signaling channels), and the other type of connection is PVC (a permanent virtual circuit, which is set-up by human negotiations on either end of a communication link to groom and define a particular channel as having a particular purpose). SVCs are dynamic, whereas PVCs are permanent or semi-permanent. Connection Layer objects are keyed off of the connection channel, which has a two number value, the first is called the VPI, which is the virtual path indicator. The second item is the VCI, or virtual circuit (or channel) indicator. The combination of these two make the dot number, for instance 0.5, where 0 is the virtual path, and five is the virtual channel. Connections other than being SVC, and PVC type connections, also come in the form of point-to-point or single connections from one host to another host, or point to multi-point where the connections go from one host to n number of hosts, also known as a party call. As shown on the left hand side of FIG. 2, connection 1 (Cnx 1) is connected to Sub Connection 1(sub Cnx 1). The Sub Connection is keyed both off of the connection object, and off of an end reference number. For point-to-point connection, the end reference number is zero. With a switched virtual circuit as mentioned earlier, the setup messages which setup the call messages which occur on the signaling channel, will have a calling and a called ATM address included in the signaling frames. Those addresses make up the keys for the host objects which are created next.

There are two host objects off of each Sub Connection. The host objects are meant to be placeholders for statistics of frames that emanate or are terminated at that particular ATM address. For an SVC type connection, the ATM host object key consists of a 20 byte ATM end system address (AESA). For a PVC type connection, no calling or called addresses are available because no signaling frames are seen or displayed. Permanent virtual circuits do not have signaling frames. There is no access to those calling and called addresses, and therefore dummy addresses are created for the host objects for the PVC connection. The link side is used, either DTE (data terminal equipment), or DCE (data computing equipment) to represent the link side or which side the data emanates from, to use that in combination with the connection numbers or channel numbers to distinguish a particular end point or host in this case. So, for instance, on the signaling channel 0.5, the connection signal 0.5 is created, a Sub Connection object below that, and the Sub Connection object links together two hosts. One host is identified as DTE.0.5, and the other host as DCE.0.5. Again, the link channel values, or sides of the link are used to determine which statistics are bound to what host, and what statistics are bound to the other host. This is identifiable because each frame that comes into the system has an indicator that identifies what side of the link the frame appeared on. For example, frames that are transmitted from the DTE side, are received on the DCE side of the link.

For certain types of connections, where the overlaid flow type is known, the Sub Host type can be deduced for creating Sub Hosts. An example would be when a particular host object is identified as an address, but at that host there are several Sub Hosts represented by that address. LAN emulation is one example. A LAN emulation client is an example of a Sub Host. A LAN emulation BUS or Broadcast Unknown Server is another example of a Sub Host. A LES or a LAN emulation server is another example of a Sub Host. Several Sub Hosts can be attached to a particular host object. Essentially what this means is that one host address is feeding or supports several separate entities or Sub Hosts which only accept types of frames that are transmitted or received at that host. The latter are sometimes referred to as multiplexed Sub Hosts. An example of this is that in a LAN emulation protocol for ATM, one can have a Broadcast Unknown Server (BUS) as well as a LAN emulation server (LES) both connected to the same host object sharing the same host address. This is operable because the types of frames that can be received or transmitted by those individual Sub Hosts are entirely distinguishable, thereby avoiding confusing frames going to and from a BUS with frames going to and from a LES. In this manner these items are multiplexed between the Sub Hosts.

The aforesaid explanation is from the connection on downward for building the Model of the present invention. The Model will now be expanded, looking from the Connection Layer upward are established flows or a connection representing the tying together of two hosts, which can have multiple data flows, or control data flows, for example, overlaid on top of the connection (i.e. flowing down the pipe representing the connection). The concept of flows is meant to accommodate the fact that one can establish multiplex flows, which means several flows riding on top of a single connection. In the present ATM Expert Model of FIG. 2, shown on the left hand side are Flow 1a and Flow 1b, which represent two separate types of flows or data frame types that have shown up on that same connection. These frame types are not intermingled, meaning part of one frame cannot overlay part of another, but simply they are time multiplexed so first one frame type comes through, followed by another frame type in a fully separate and independent manner, although they do exist off the same connection channel in this case.

The flow types as well as the Sub Host types are determined by frame contents. Signaling Setup messages were mentioned above. The setup messages have an element known as the Broadband Low-Layer Information element (BLLI), that is made up of several sub-elements. The most important sub element is known as a Protocol Identifier (PID), or Protocol ID. Protocol ID, in some cases, will give the implementer a clue as to what type of flow is going to be present on that connection that is being set-up with the set-up frames. For instance, a BLLI PID value of 1 is defined to indicate a LAN emulation control frame. PID values of 4 and 5 are defined to represent the LAN emulation Multicast Data frame. PID values 2 and 3 are a LAN emulation unicast data frame. Accordingly, this information can be used to deduce some of the various types of flows that can show up on that connection. In case of a switch connection, SVC where BLLI information exists, the task is to simply deduce what type of flow lives on that connection (using the PID along with flow frame information) and create these flow objects.

The flow objects shown in FIG. 2 are tied from below to the connection. In the case of a PVC connection, no related signaling information exists therefore no BLLI PID values can be obtained. As a result, it is necessary to deduce the actual frame types or flow types from the frame contents that can actually be retrieved from the data stream.

Each frame type with an ATM system has different headers, and different header contents. Generally there is some sort of indication in the header that identifies what type of frame it is. Whether it is, for example, a data frame, or a control frame. The control frames come in many different configurations. LAN emulation examples of control frames are Configuration frames, Join frames, LEARP frames, Flush frames, and several others. Each of them have a unique op code within the frame itself that dictates what type of frame it is. The way the protocol is set up, only certain frame types can be observed over certain flows. In the examples included, several types of flows that exist for LAN emulation support, are a Configuration Direct (CFGDIR) flow, a Control Direct flow (CTLDIR), Control Distribute flow (CTLDIS), Data Direct flows (DD8023 or DD8025), Multicast Forward (MCF8023 or MCF 8025) and Multicast Send flows (MCS 8023 or MCS 8025). The data flows over each of these entities is generally unique with some exceptions, and that alone with other small pieces of evidence extracted from the data stream can be used to uniquely deduce the flow type without the need for the BLLIPID information.

The Application Layer as its called in the present ATM model is a client's view of the ATM network. In LAN emulation and MPOA, certain devices are referred to as clients. In LAN the devices are referred to as LAN Emulation Clients (LEC), and in MPOA its referred to as Multi-protocol Clients (MPC). Since it is these clients that form the bridge between the ATM networks, and the Legacy LANs, it is important to understand the correlation between the two in order to have a full network view of the entire network. The LAN emulation provided by the client (LEC) is represented by an ATM Edge device 16 or 22 connected to Ethernet or token ring type workstations 24 or 18 (see FIG. 1). A LAN emulation client becomes the bridge between the Legacy LANs and the ATM network. There are several control flows, connections, or pipes, however one wants to describe them, that are used in support of a LAN emulation client so that the LAN emulation client will appear to the Legacy LAN as yet another LAN node on that particular ring or segment. There are control flows and data flows associated with the client, which include a Configuration Direct-flow, a Control Direct flow, and a Control Distribute flow. The data flows include Data Direct flow, Multicast Forward flow, and a Multicast End flow. Each of these flows has a particular finction. The control flows are used to establish data connections between one LAN emulation client, representing one or more DLC or Ethernet Token Ring type addresses, and another client that represents another class of addresses. The control flows are used in establishing and tearing down those data connections. The data flows are actually the pipes that are put up between these clients that then allow the LAN connected to each of the clients to talk with each other. Basically it is the bridge between the two clients representing individual LAN segments or rings.

The Application Layer, as mentioned earlier, represents the clients view of the world. The particular model presented in FIG. 2 shows two Applications; Application 1 has three Flows below it, Flow 1a, Flow 1b, and Flow 2. Application 2 has two flows beneath it, Flow 2 and Flow 3. An example for Application 2, would be if Application 2 represented a LAN emulation client and beneath that application it has two flows. Assume that Flow 2 is a data direct flow, and Flow 3 is a control direct flow. Data direct flows are typically shared between two applications, or are in other words shared between two clients. As previously mentioned, it is the bridge between two clients. FIG. 2 illustrates the fact that two clients represented by Applications are attached to the same flow, and in Flow 2, in this example the flow would be a data direct flow. The aforesaid provides an idea of why there would be flows shared between various Applications. Again, the Application Layer essentially represents the client's view of the world.

The client is also represented by a particular Sub Host. As previously mentioned, there are LAN emulation clients, LAN emulation servers, e.t.c., that are Sub Hosts types. However, when looking at the client's view of the world, the Sub Hosts that are of greatest interest is the client itself. For LAN emulation that would be the LAN Emulation Client, and for MPOA that would be the Multi-Protocol Client. The Application is tied indirectly to the Sub Host client, but the connection path is not shown in FIG. 2.

Figure 6:
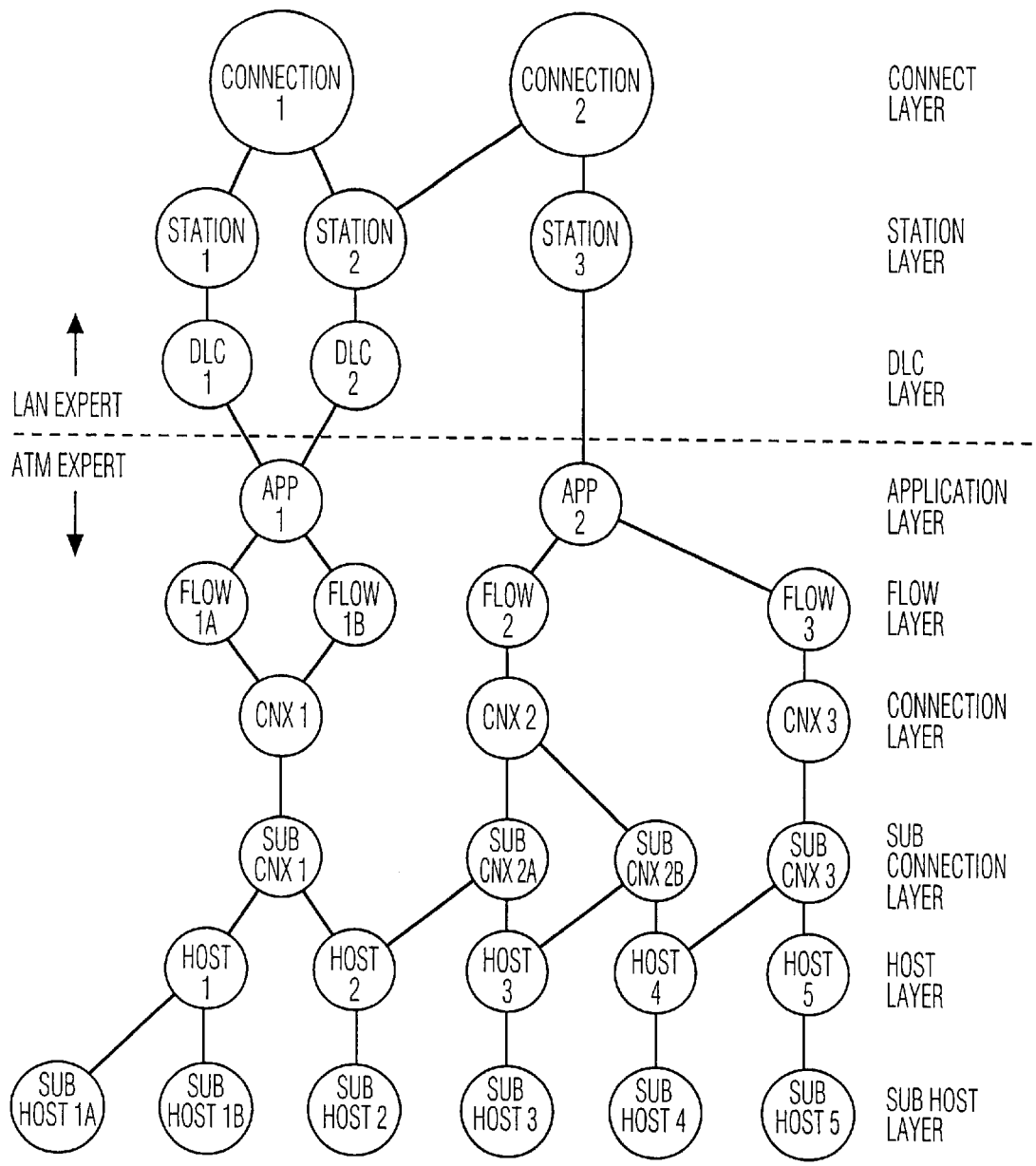
FIG. 6 shows another embodiment of the invention where the present ATM Expert Model is connected to a LAN Expert Model.

This basically forms the six layers of the ATM Expert Model of FIG. 2. What isn't illustrated therein is the fact that this entire ATM Expert Model lives right beneath the lowest level in the LAN expert models. Such an illustration is shown in FIG. 6. The lowest level being the DLC (Data Link Control) level. As mentioned earlier, DLC addresses in such or DLC objects are essentially the work stations or end points found in either Ethernet or Token Ring type networks. Therefore, these Applications which represent clients, represent LAN emulation of those DLC type addresses. Therefore, when the ATM Expert Model is tied into the LAN Expert Model, the Applications in the ATM Expert feed their data contents into are the bottom of the DLC layer in the LAN Expert Model, as shown in FIG. 6. DLC as used in the NAI Sniffer LAN Expert refers to data link control, but for all intents and purposes the Objects represent Workstations in a Token Ring 8023.5, Ethernet 802.3, or LAN topology.

Figure 3A:
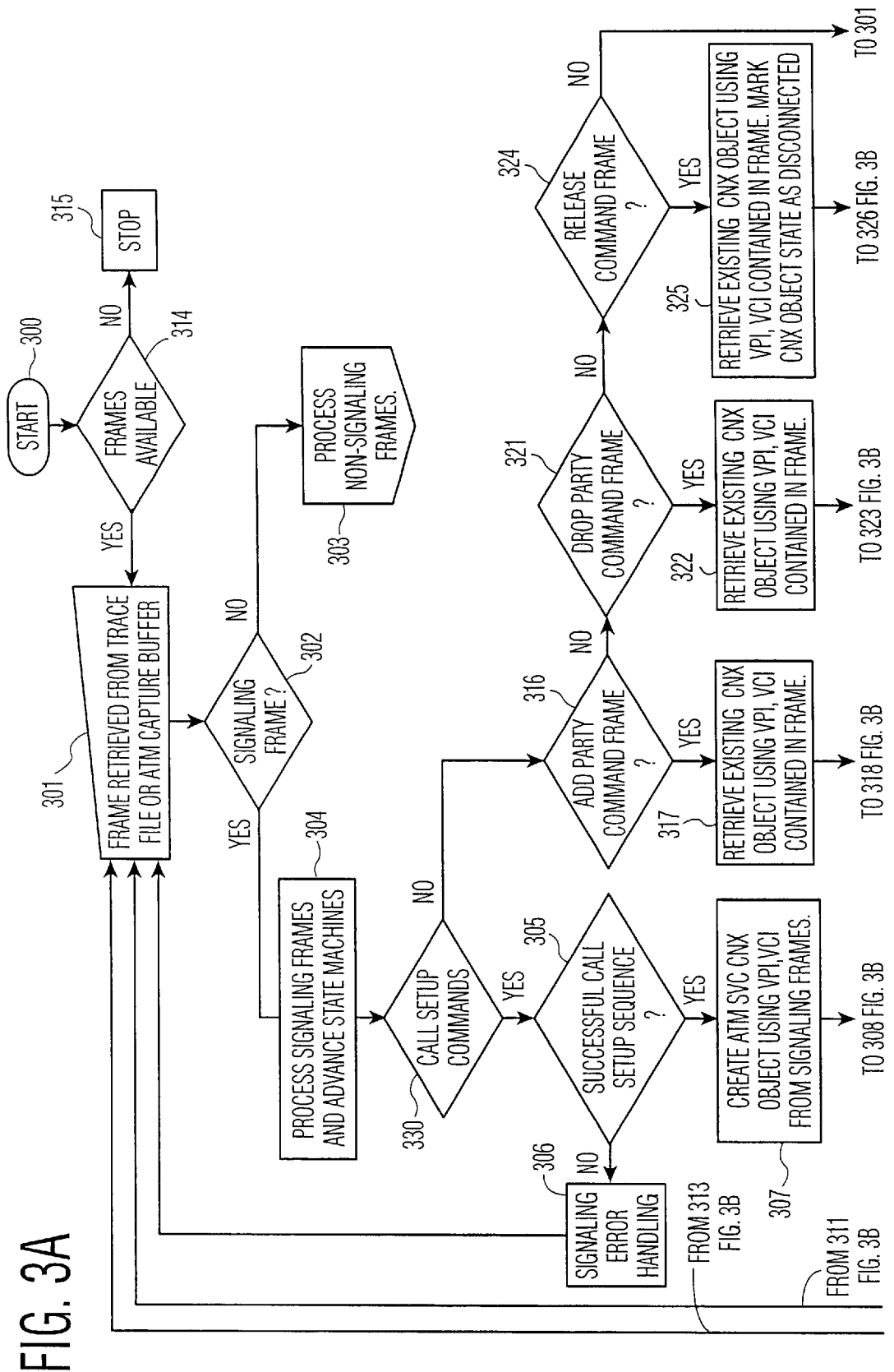

FIGS. 3A and 3B will now be discussed for the flowchart for the "ATM Expert Model Synthesis". At the start, the Connection Layer of FIG. 2 is entered into. At this layer one sees the interconnections or switch circuits, known as the SVC, or switched virtual circuits, in addition to the PVC's or Permanent Circuits. In FIGS. 3A and 3B, from start Step 300 an input routine Step 301 is entered, for retrieving a frame from the trace file or ATM capture buffer 12 (see FIG. 1). Frames are retrieved and inputted into ATM Sniffer 2 via link or bus 9, which is attached to the ATM network 20 on connection 15 and brought into the NIC Card 8 which is processed by the WinNT processor 6. These particular frames are stored in capture buffer memory 12 or on hard disk 10. The present ATM Expert System, also identified as an ATM Sniffer 2, retrieves the frames or the frames that were presented to the Expert System, from buffer memory 12 or hard disc 10. It makes no difference, since the frames have time stamps associated with them. This occurs in process Step 301. In decision Step 302 the frame header is checked to verify whether the frame is a signaling frame or non-signaling frame. Typically signaling frames are found in a signaling channel 0.5, but this is not always the case. In the case of the decision being "No", then Step 303 for processing a non-signaling frame is entered as described below for the flowchart of FIG. 4 (processing transfers to step 401). If the decision is "Yes", the signaling frames advance state machines for signaling in Step 304, that is the statistics for the signaling channel are obtained. Different types of signaling frames include Set-Up, Call Proceeding, Connect Acknowledge, as well as Call Release are various examples of signaling frames used in the state machine for the call setup sequence. Step 304 takes into account the various types of signaling frames that have been received, of greatest concern is whether the call has been successfully set up or not. Next, in Step 330, it is determined if call setup commands have been received. If "Yes", the next Step 305 checks to see if the call was successful in being set-up. If the result is "No", the call set-up has failed, then the database is examined for the signaling channel to see what the cause of the failure might be, or if there is a status in the signaling frames that indicates what the error might be, it is reported to the user. The rest of the frame is dropped, and the next frame is retrieved via Step 301. If these call setups have been successful, as indicated by "Yes" in Step 305, Step 307 is entered. In Step 307, the SVC connection object, that is the database object, is keyed using the VPI/VCI combination (virtual path indicator, virtual channel-indicator, respectively). Next in Step 308, the ATM Sub Connection objects are created using a unique key specific to the connection object shown in Step 307 as well as the end reference number which is extracted from the signaling frames. This object, the Sub Connection object is attached below the connection object. As a result, there is a relation established between the connection object and the Sub Connection object, and the Sub Connection resides at the next lower level of the hierarchy. In a case of point to multi-point flow, there is a special type of signaling frame known as an add party or drop party frame, which simply indicates that for a particular connection one wants to add or remove another leaf or party to or from the existing connection. This essentially translates to creating or destroying yet another Sub Connection object and connecting or disconnecting it to or from a preexisting connection object. The end reference number is different for each Sub Connection or leaf off of the same connection, and this can be extracted from the add party commands or frames.

Next in Step 310, the BLLI or the broadband low level information item from the setup frames is extracted, and along with the PID which is the protocol identifier, and the BLLI protocol identifier from the signaling frames, may give some indication of the type of flow that is going to be present on that connection. Various examples would be a PID value equal to 1, which indicates a LAN emulation control type flow. There are three different LAN emulation control type flows, so it does not specify exactly which one of those flows are going to be used. Other examples would be PID value 2 and 3 which represent data direct LAN emulation data flows. Use of this information can be used in limited cases to determine the types of flows, and therefore the types of Sub Hosts or end points that are going to be created.

Next in Step 311 a check is made to see if the flow type is known. If it is "No", not known, then at this point processing is discontinued on that frame, and Step 301 is re-entered to retrieve the next frame. If it is "yes", the flow type is known, and Step 312 is entered.

If the flow type is known, for example, it is a Data Direct flow, then it can be assumed correctly that the Hosts serving either side of the Connection or Flow are LAN emulation client's (LEC's). At this point in time, the ATM host objects are created in Step 312 using the calling and called ATM addresses (20 byte ATM addresses) extracted from the signaling setup frames, and the unique ATM Host Objects are also created using those individual addresses as keys. If the flow type is known, as just mentioned a Data Direct type of flow, LAN Emulation Clients are represented by those ATM Hosts. Therefore two ATM Sub Hosts are created, each one of them being an LEC-type, and each being associated with relevant ATM Host Objects. The ATM Sub Hosts are attached below their associated Host Objects, or in other words at a lower layer of the hierarchy. The ATM Flow Object is also created in Step 313, as it is attached to the top of the connection object or one layer higher in the hierarchy than the associated connection object. Attachment meaning that there is a relationship or link formed between the connection and the flow objects.

If in Step 330, the answer is "No", Step 316 is entered to determine if an "Add Party command frame" has been made. If in Step 316, the answer is "Yes", Steps 317 through 320 are carried out as indicated. If in Step 316, the answer is "No", Step 321 is entered to determine if a "drop party command frame" has been made. If the answer is "Yes", Steps 322 and 323 are carried out as indicated. If in Step 321 the answer is "No", Step 324 is entered to determine whether a "Release Command frame" has been made. If in Step 324 the answer is "Yes", Steps 325 and 326 are carried out as indicated. However, if the answer is "No", the latter 2 steps are bypassed, and Step 301 is re-entered. Note also that at the termination of Steps 320, and 323, respectively, Step 301 is re-entered.

A decision Step 314 is shown between the Start Step 300 and the Frame Retrieval Step in 301. Frames are retrieved from the Trace File 10 or Frame Capture Buffer Memory 12 (see FIG. 1), until either is exhausted, or the capture buffer 12 is filled, in which case "Stop" Step 315 is entered. If there are frames available, then processing is from Step 314 to Step 301.

Figure 4:
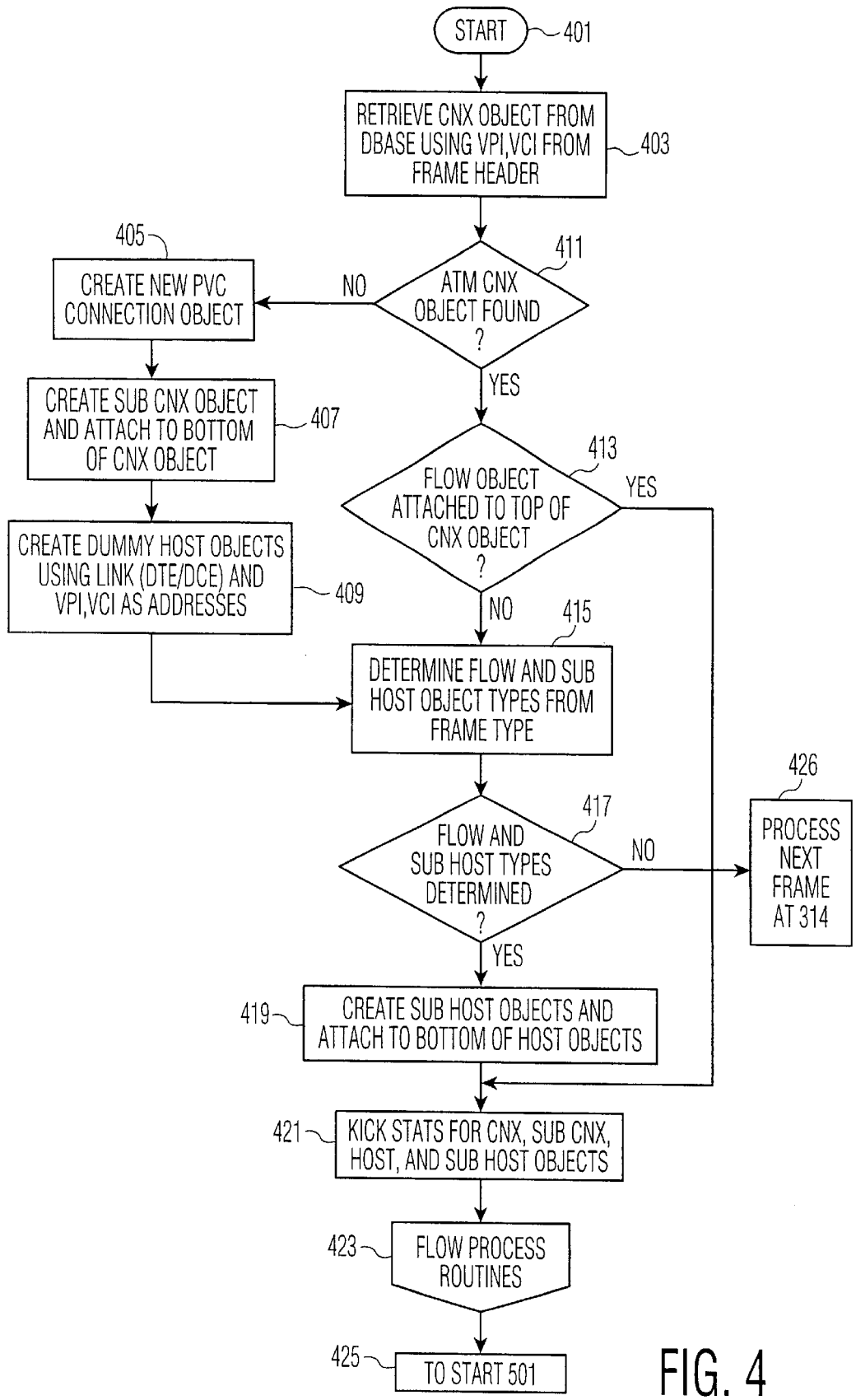
FIG. 4 is a flowchart showing the processing of nonsignaling frames for an embodiment of the invention.

For nonsignaling type frames processing begins in Step 401 of FIG. 4. A frame that has been determined nonsignaling now enters into this process. The VPVCI (Virtual Path Virtual Channel Identifier) or channel is used to retrieve the connection object from the connection data base. The VPVCI is extracted from the frame header in Step 403.

Next, decision Step 411 is entered to determine whether the ATM connection object has been generated. The ATM connection object is generated in one of two ways. Either it is set up via the signaling channel or a data frame has been seen before this on the same connection. In the case of Step 411, if there is no object found, this means that signaling has not set up this connection channel. It is assumed it is a PVC or non-signal type of connection, so a PVC Connection Object is created. The channel numbers extracted from the frames are used to key the Object. This is done in Step 405. The inventive system automatically creates Sub Connection Objects in Step 407 with an end reference number of zero, and attaches these below the Connection Object in the hierarchy. The one key thing about PVC Connections is that they cannot be point to multi-point connections. They can only be point-to-point. Therefore, there can be no associated add parties which holds true since no associated signaling is associated with this connection.

Next is Step 409 for creating dummy host objects as placeholders of items that are attached to either side of this PVC type of connection. The link side DTE or DCE is used depending on what side of the link data is first seen on in conjunction with the VPVCI channel to create a host address. For example, DTE.0.38 or DCE .0.38 for two hosts that hang off of a PVC Connection channel 0.38.

Processing continues at Step 415. This Step merges the two paths for a Connection Object found and not found. In decision Step 411, if the ATM object is found and the answer is "Yes", Decision Step 413 is entered to determine if there is a Flow Object attached or is there a relationship between a Flow Object and a Connection Object. If the answer is "Yes", a relationship to Flow Objects at the top of the Connection Object exists and the programming moves from Step 413 to Step 421. If they don't exist, then processing moves from Step 413 to Step 415.

In Step 415, the flow and Sub Host Object types from the Frame type are determined. The Frame type is deduced by examining the contents of the Frame since certain op codes in the frame will give a clue as to the Frame type, and only certain Frame types are seen over certain flow types. Knowing that information, the Flow type is deduced.

Next, Decision Step 417 is entered to inquire whether the Flow and the Sub Host types have been determined. Note that if the Flow type is known, then the associated Sub Host Object types are known. If the Flow and Sub Host Object types are not determined ("No"), then processing proceeds from Step 417 to Step 426, for processing the next Frame at process Step 314. If the Flow and Sub Host types are known, the Sub Host Objects must be created in Step 418, and attached to the bottom of the Host Objects i.e. below the Host Objects in the hierarchy with relation to the Host Objects. Processing proceeds from Step 418 to Step 421. The statistics are incremented or compiled for the Connection Objects, the Sub Connection Objects, and the Host and Sub Host Objects. Next, Step 423 is entered for determining specific flow routine. Thereafter, Step 425 is entered to transfer to Start Step 501 of the flowchart of FIG. 5.

Note that in decision Step 413, if the Flow Object is already attached to the of the Connection Object, it is not required to create the Flow and Sub Host Objects as they should exist. Accordingly, processing moves from decision Step 413 to the top of Step 421 and then continues.

Figure 5:
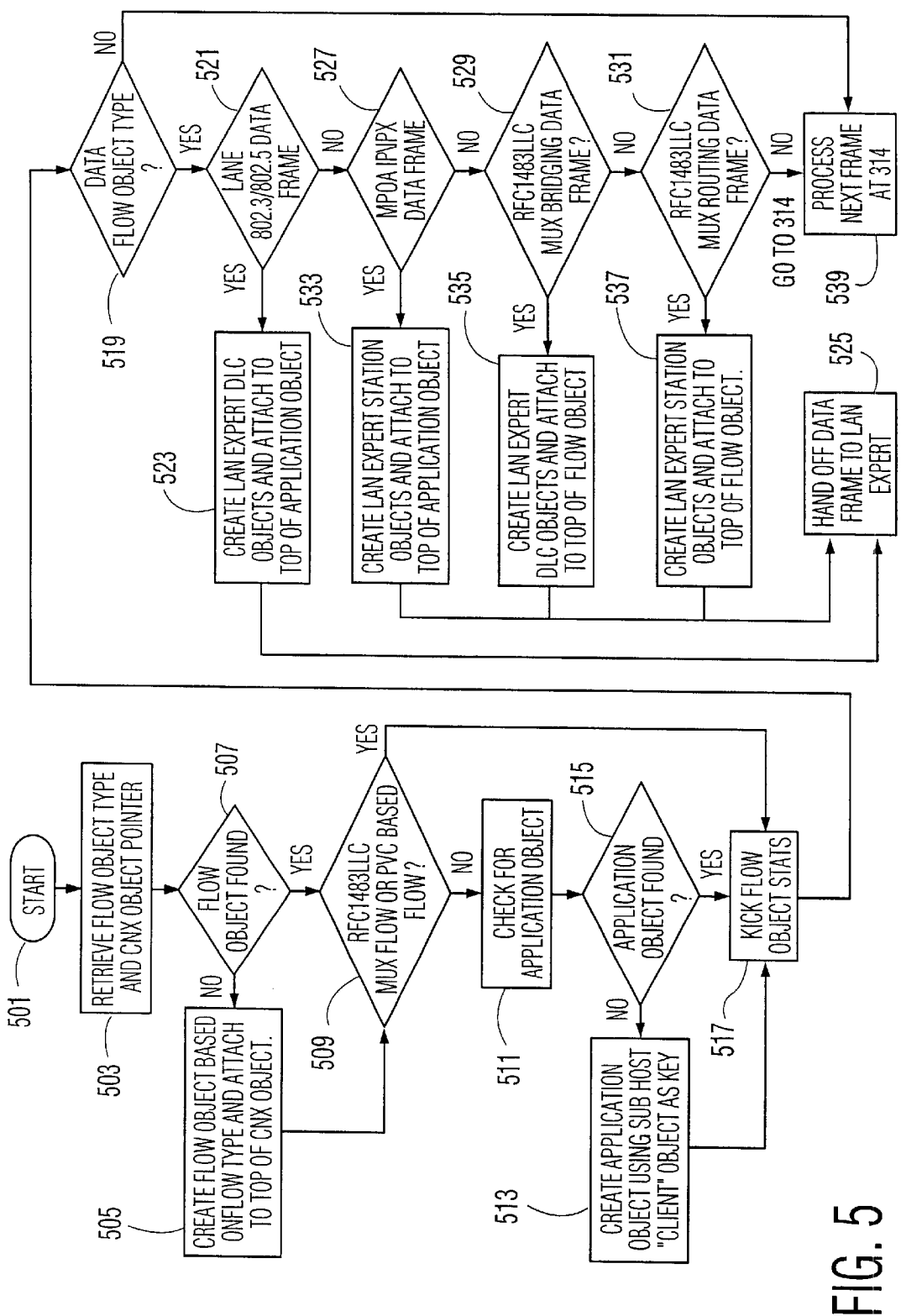
FIG. 5 is a flowchart showing process flow routines for one embodiment of the invention.

In FIG. 5, an ATM Expert Model synthesis of the process flow routines is shown. Starting at Step 501 and moving on to Step 503, the Connection Object is used as a key along with the flow type to retrieve the associated Flow Object from the flow database. Next, in Step 507 it is determined whether the Flow Object has been found. If it has not been found processing moves on to Step 505 for creating the Flow Object based on the flow type. The Connection Object address along with the Flow type and Mux ID forms the key of the Flow Object, and this Object is attached to the top of the Connection Object. For Non Muxed Flows the Mux ID is zero. For Muxed Flows the Mux ID is extracted from the frame.

From Step 507, if the Flow Object is found, the answer is "Yes", and processing proceeds to Step 509. In Step 509 it is determined whether or not this is an RFC 1483 LLC multiplexed or PVC based flow. In the case of either, if it is an RFC 1483 multiplexed flow or PVC based flow there is no Application Object that is going to be associated with this Connection or Flow. Therefore, the answer is "Yes", and processing moves from decision Step 509 down to "Flow Stats" Step 517. Returning to Step 509, if this flow is not PVC or RFC 1483 Muxed based (answer "No"), or its not an analogous flow, processing moves onto Step 511 to check for the Application Object. The Application Object, if created, would be attached to the top of the Flow Object or one layer higher up in the hierarchy.

Next, in decision Step 515 to determine if the Application Object has been found, if the answer is "No", Step 513 is entered to create the Application Object using a Sub Host Client Object which is attached by proceeding down through the hierarchy, down through the flow, down through the Connection and Sub Connection layers to the Host, down to the Sub Host. The flow is going to dictate the types of Sub Hosts that are attached on this connection, and in addition the location of the Client Sub Host to be used to Key the Application Object. An example would be a Control Direct Flow Channel that has as its client a LAN Emulation Client, and the other side of the flow would have a LAN Emulation Server to this very Application. The LAN Emulation Client (LEC) is going to be the basis by which an Application Data Base Object is created. The Sub Host Client (LEC) address is used as a key to create the Application Client.

Processing next moves from Step 513 to Step 517 to kick the flow stats for this object, meaning statistics counters are incremented, and various informational pieces are extracted from the data stream that are flow specific to up-date the flow data base. Basically there are two major types of flows, one is a Data Flow and the other is a Control Flow. Processing moves from Step 517 to decision Step 519, to determine whether data flow is a Control Flow Object Type, or whether it is a Data Flow Object Type. If it is "No", processing moves onto the next frame which is found in Step 539 to transfer to process the next frame at Step 314 (FIGS. 3A and 3B). If it is "Yes", and it is a Data Flow Type of object then processing proceeds through a plurality of the decision block steps to determine what exact kind of Data Flow Object it is. The first test which is in Decision Step 521 asks whether it is a LAN Emulation or LANE802.3 or802.5 data frame. If the answer is "Yes", then Step 523 is entered to create two LAN Expert Objects at the DLC layer. These objects are created using the pair of six byte MAC addresses (Media Access Control addresses) that are extracted from the802.3 or802.5 specific portion of the data frame, respectively. The DLC Expert Objects are created and they are attached to the top of the Application Object.

Programming or processing next moves from Step 523 to Step 525, for transferring or hand off of the data frame to the LAN Expert portion of Sniffer software. Prior to Step 525, all ATM relevant headers and trailers are stripped from the Frame so that the resulting Frame looks like an 802.3 or an 802.5 LAN Data Frame. In FIG. 2, the DLC Objects would be attached above the Application level objects as previously shown in FIG. 6. Going back to decision block Step 521, if it is not a LAN emulation 802.3 or 802.5 Frame, decision block Step 527 is entered to determine whether this is an MPOA, IPX or IP data Frame. If the answer is "Yes", LAN level Expert Station objects are created in Step 533 using either the IP or IPX layer 3 source and destination addresses extracted from the LAN portion of the ATM encapsulated frame. These objects are created and attached to the top of the Application Object.

Next, in Step 525, the relevant ATM headers and trailers are stripped off, and the Frame is handed off to the LAN Level Expert. Going back to decision Step 527, if it is not an MPOA, IPX (Internet Packet Exchange Protocol), or IP (Internet Protocol) data frame, processing moves down to decision Step 529. In Step 529, it is determined whether this type of data flow is an RFC 1483 LLC (Logical Link Control) multiplexed bridging data frame. If the answer is "Yes", processing moves to Step 535 to create LAN level DLC expert objects using again the source and destination MAC addresses extracted from the data frame, and these objects are attached to the top of the LLC multiplexed Flow Object that was created back in Step 505 or was precreated and retrieved in Step 503.

Next, in Step 525, the ATM trailers and headers are stripped off, and the frame handed off to the ATM LAN Expert. Going back to decision Step 529, if it is determined that it is not an RFC 1483 LLC (Logical Link Control) Mux bridge and data frame, processing moves onto decision block Step 531 to determine whether it is an RFC 1483 LLC Mux Routed Data Frame. If the answer is "Yes", then LAN Level Expert Station Objects are created using the source and destination of layer 3 IP or IPX addresses extracted from the LAN portion of the ATM encapsulated data frame.

Processing now moves from Step 537 to Step 525 to strip off the ATM headers and trailers, and hand the data frame off to the LAN Expert of FIG. 6. Note that in Step 537, once the Station Objects are created, they are attached to the top of this Flow Object. Going back to decision Step 531, if it is found that the data frame is not a routing data frame RFC 1483 LLC Mux Routing Data Frame, Step 539 is entered to transfer to process Step 314 in FIGS. 3A and 3B, which essentially functions to fetch the next frame.

From the configurations shown and described above for the present invention, it is clear that the main use of the present invention is as a management and troubleshooting tool in a very complex network environment involving Asynchronous Transfer Mode (ATM) movement of data.

The relevant portion of the LAN Expert Model (FIG. 6) will now be described. This Model was developed by NAI, and has been incorporated in their product line as a "Sniffer Pro LAN", for providing the management and analysis of a LAN network. Each of the relevant layers of the LAN Expert Model will now be described. The DLC Layer, in this example, represents two LAN workstations identified by their MAC address as "DLC 1", and "DLC 2", for example. The Station Layer represents IP or IPX (Internet Packet Exchange) addresses for Layer 3 of the OSI Model. The Connection Layer represents the connection between the Layer 3 stations, i.e. TCP (Transmission Control Protocol), UDP (User Datagram Protocol).

Figure 7:
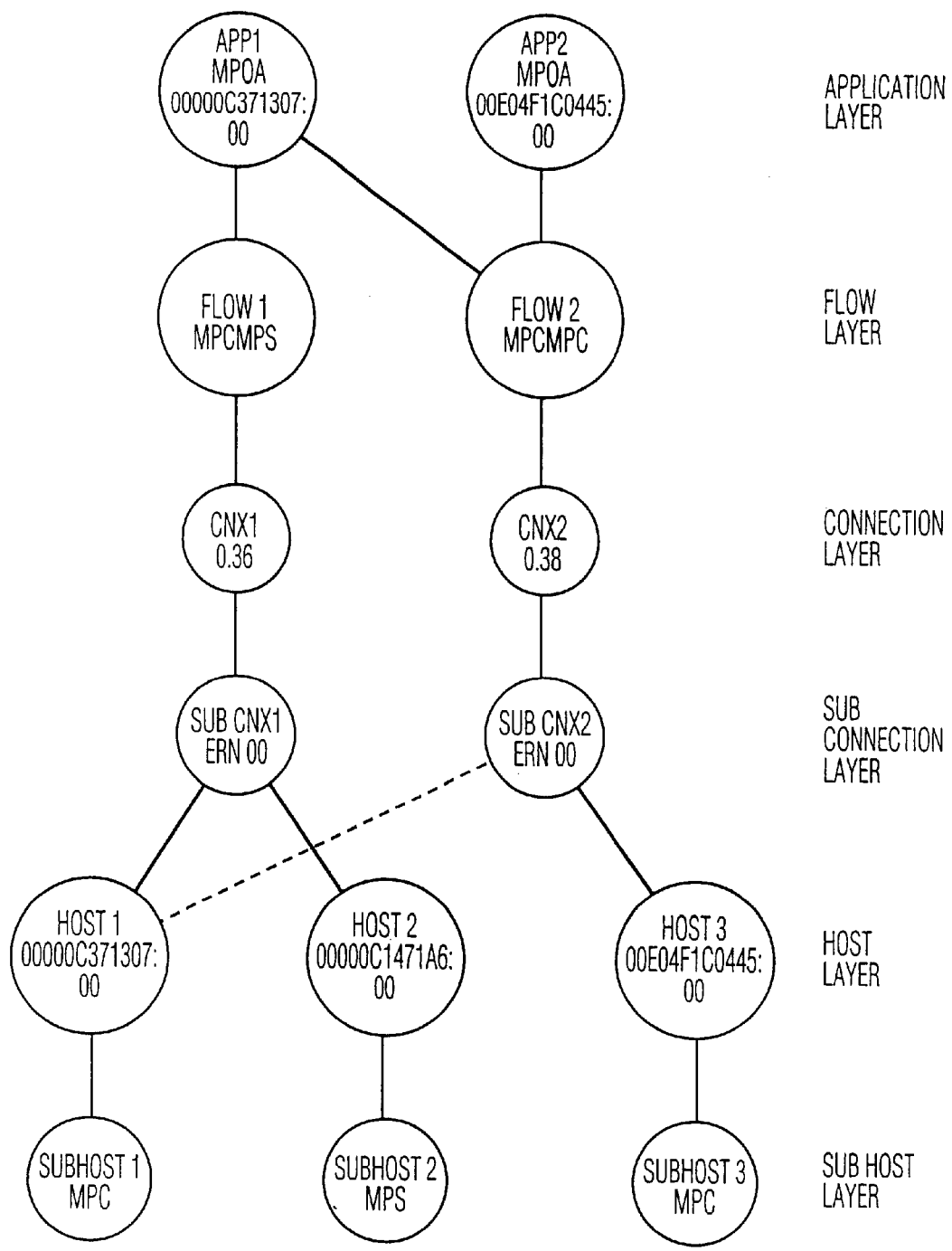
FIG. 7 is an example of an MPOA Application as applied to the ATM Expert Model for an embodiment of the invention.

In FIG. 7, an ATM Expert Model is shown for an MPOA example. The example shows various objects that may appear at the various layers of the ATM segment being accessed by the ATM Sniffer Expert System 2 of the present invention. Note that the example of FIG. 7 is related to various ones of the display of FIGS. 5, 13, 15, 17, 18, and 19, which are discussed below.

Before proceeding further, it may be helpful to provide an overview of the ATM LAN Emulation (LANE) and Multiprotocol over ATM (MPOA) Expert support. Reference by incorporation is made to the ATM Forum LANE V2 specification (AF-LANE-0084.000 July '97) to understand the specifics of LANE Emulation as it applies to ATM, LAN 802.3 and LAN 802.5 layer 2 bridging, and to the ATM MPOA V1.1 specification (AF-MPOA0114.000, March '99) to as it applies to layer 3 routing over ATM networks. Note that the layers are as defined in the Open Systems Interconnection (OSI) standard. There documents are incorporated by reference herein to the extent they do not conflict herewith. An Emulated LANE (ELAN) may only support either 802.3 or 802.5 traffic. The ATM Emulated LAN (ELAN) acts as a layer two bridge and as such can only transport data from one LEC (LAN Emulation Client) to another on the same ELAN thus supporting only intranet traffic. To send data to another Subnet routers must be available to the LECs with the resulting route consisting of one or more hops. MPOA solves the multiple hop problems by providing the LEC's with access to MPOA Clients (MPC) who act as Layer 3 forwarding devices and MPOA Servers (MPS) who take on the role of a router thus providing the LECs with internetwork capability.

Figure 8:
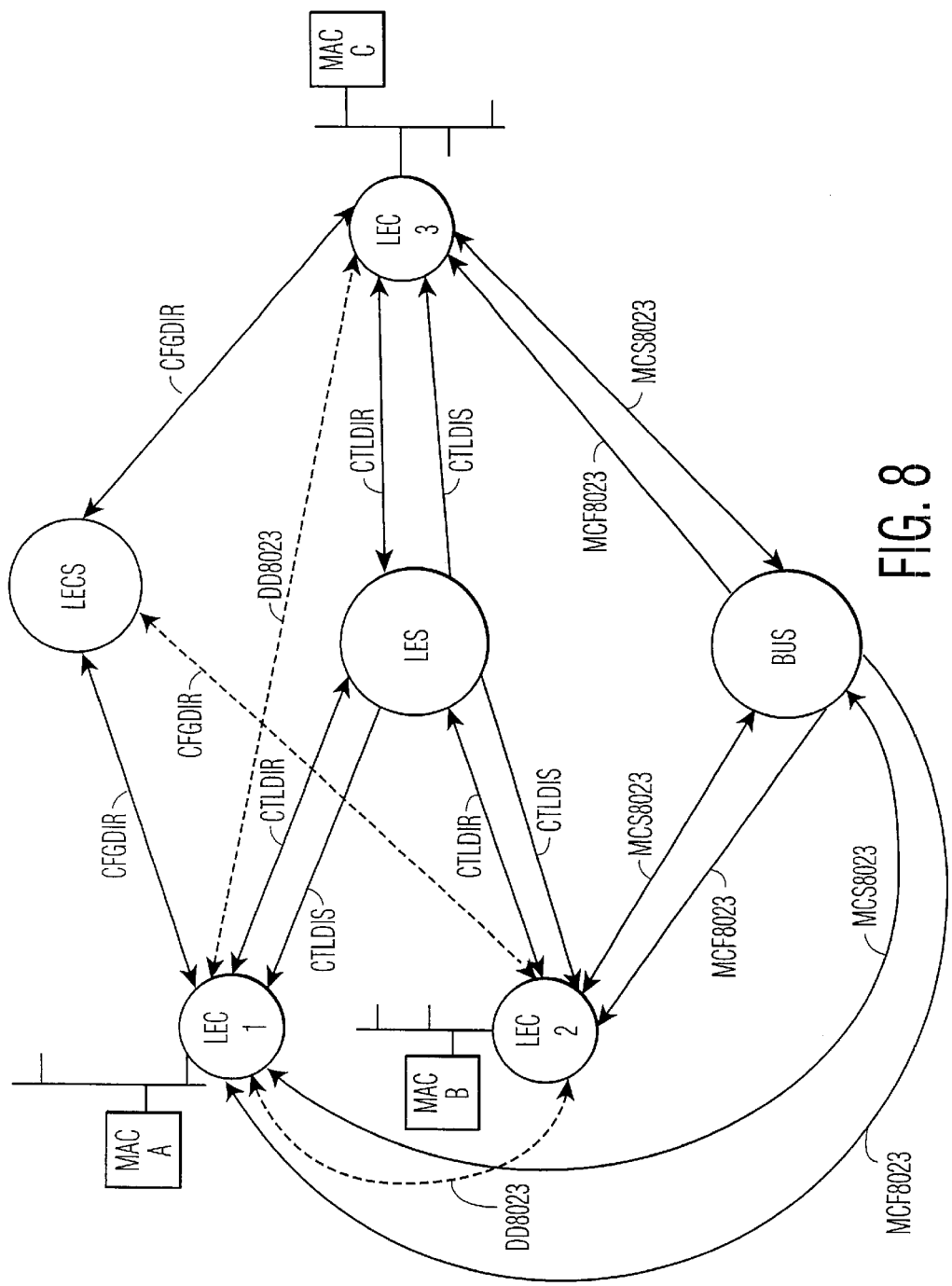
FIG. 8 is a diagram showing an example of a typical LANE application.

Operation of ATM LAN Emulation (LANE) will now be described. As shown in FIG. 8 for a typical LANE Application, when a legacy LAN or ATM Host associated with a MAC A (Media Access Control A) Workstation, in the example, has Layer 2 traffic to send over the ATM network, it sends the traffic to its (attached) LEC (LEC 1). The LEC examines the destination MAC address Workstation in the frame (for MAC C in this example) and issues a LEARP (LAN Emulation Address Resolution Protocol) message to its associated LES (LAN Emulation Server) to retrieve the ATM address of the LEC (LEC 3) which represents the destination MAC C address. The LES issues the LEARP to all LEC's, which are attached to the LES (on the same ELAN), and the LEC that represents the destination MAC C responds with its ATM address. The LES caches the MAC\ATM address pair (binding) and passes this information or data back to the source LEC 1. The source LEC 1 then sets up a Data Direct VCC (DD8023) to the destination LEC 3 and the Layer 2 traffic is then sent over this path. Since data can only be sent between LEC's on the same ELAN\Segment\Subnet and so forth, Internet traffic is not handled and either routers or MPOA is used for Layer 3 forwarding\routing. Note: no mention of broadcast\multicast data handling was mentioned so as to keep the example simple.

Figure 9:
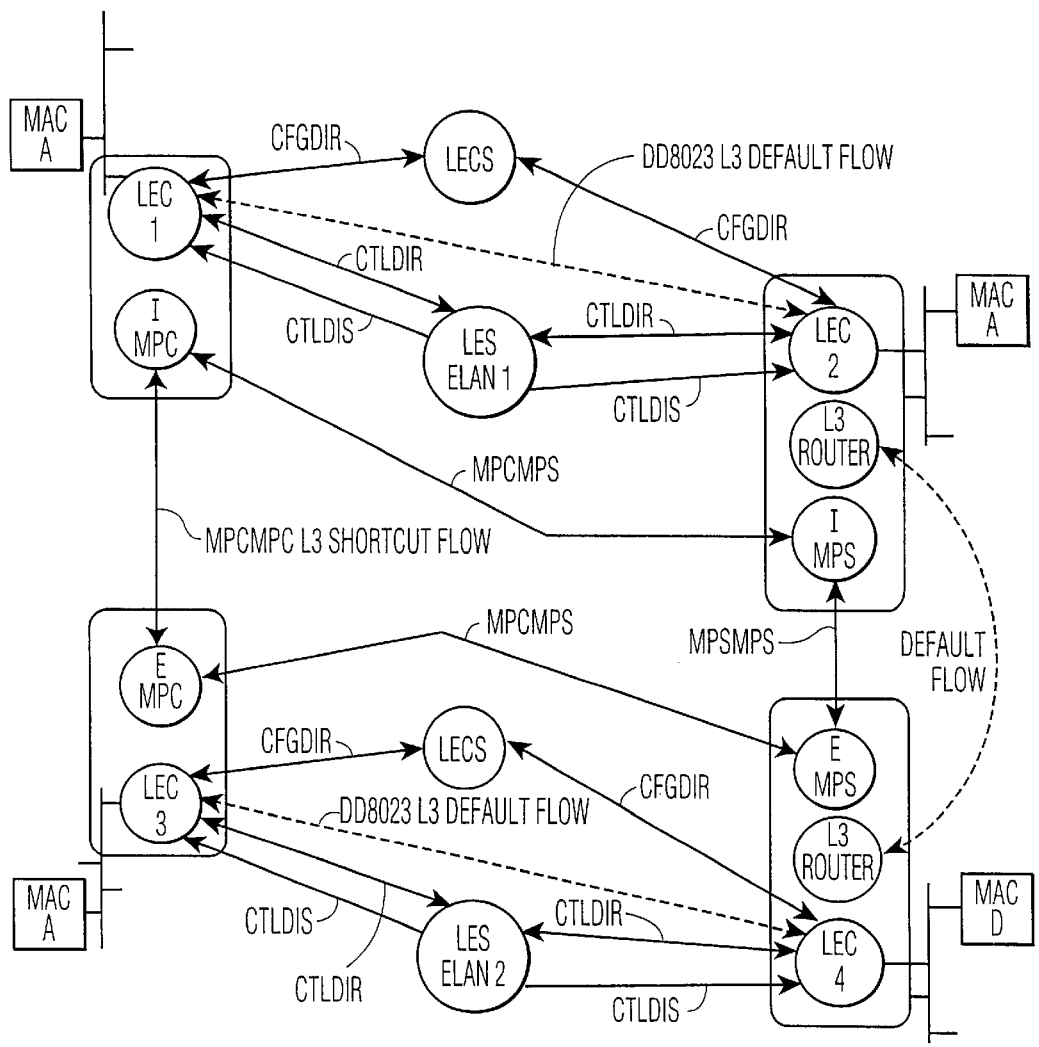
FIG. 9 is a diagram showing an example of a typical MPOA application.

The operating of Multiprotocol Over ATM (MPOA) will now be described, with reference to FIG. 9 showing a typical MPOA Application. When an MPOA capable ELAN has Internet traffic to send, the source LEC (bound to an Ingress MPC) forwards the data to an Ingress MPS (IMPS) capable LEC, and Issues an MPOA Resolution Request over the MPCMPS to its IMPS. The IMPS, which supports routing, sends the Layer 3 packet to its final destination over the "n" hop default path" and also issues a request to a neighboring EMPS (Egress MPS) to determine the ATM Address of the Egress MPC which represents the destination Layer 3 address of the packet. The EMPC sends the destination ATM address back to the IMPC (via the MPS's over the MPCMPS channels). When the IMPC determines that the Layer 3 traffic that it is forwarding to the destination Layer 3 address has exceeded a threshold, the IMPC creates a MPCMPC shortcut VCC to the EMPC using the aforementioned retrieved destination ATM address and the traffic is now sent over this VCC "short cut flow" rather than the original "default" routed path. Thus the "n hop" route is replaced with a single hop route. MPOA currently supports the creation of ATM VCC MPCMPC shortcuts between MPOA Clients carrying IP and IPX (Internet Packet Exchange) Layer 3 data traffic.

An ATM Emulated LAN (ELAN) consists of a plurality of host components, which will now be described as follows below.

LEC: LAN Emulation client, which appears as a bridge to an 802.3 or 802.5 legacy LAN and acts as the Interface between the LAN and the ATM network. The LEC may represent any LAN MAC device on the LAN segment to which it is attached. LAN MAC addresses MAY NOT be shared by any other members of the same ELAN and should not be shared by any other ELAN. A LEC may not be attached to more than one ELAN at a time, as shown in FIGS. 8 and 9.

LES: LAN Emulation Server which is used to forward LEARP requests from one LEC to one or more LECs attached to the same Emulated LAN. Generally a LES is used to resolve LE ARPs (LAN Emulation Address Resolution Protocol) which are issued when one LEC representing a given MAC address has a data frame to transfer to a destination MAC address and the source LEC wishes to know the ATM Address of the destination LEC representing the destination MAC device. LES MAY NOT service more than one ELAN at a time, as shown in FIGS. 8 and 9.

LECS: A LAN Emulation Configuration Server is used to direct the LEC to attach to a specific ELAN (LES) based on the LECs requirements (ELAN type 802.3/802.5, data service rate etc). Reference is made to FIGS. 8 and 9.

BUS: Broadcast and Unknown Server, as shown in FIG. 8, is used to distribute multicast, broadcast, and unknown data frames issued by a LEC to some or all members (LECs) on the ELAN. Unknown frames are data frames to be sent to a given LEC before the Data Direct flow to the target LEC has been setup (prior to successful LE ARP) A BUS MAY NOT service more than one ELAN at a time.

The ATM MPOA consists of a number of host components, which will now be described as follows with references to FIGS. 8, 9, and 11.

MPC: MPOA Client, which appears as a layer 3 forwarding device to an 802.3 or 802.5 legacy LAN or ATM Host (via a LANE LEC). The MPC acts as a server for associated LANE LECs that wish to send internetwork traffic across an ATM network. MPC's can support multiple LEC's but LEC's can be bound only to one MPC.

Figure 10:
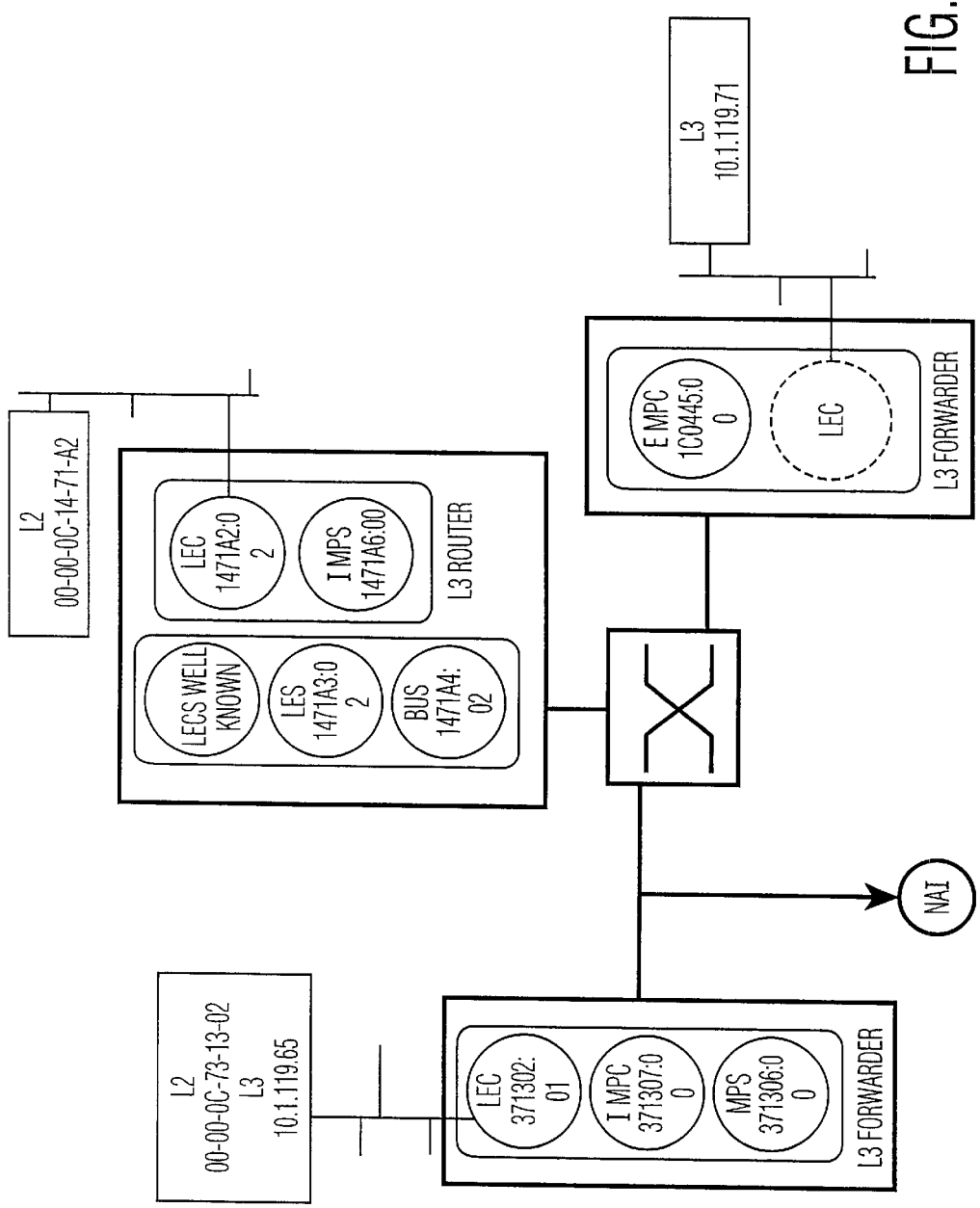
FIG. 10 is a schematic diagram showing an example of the network elements extracted from captured trace file MPOAO1A.CAP for a physical view of an MPOA/LANE application.

MPS: MPOA Server which is used to forward default Layer 3 traffic across an ATM network and to route Layer 3 destination\ATM Address resolution requests from one MPC to another. MPS's can support multiple LEC's but LEC's can be bound only to one MPS. Note that FIG. 10 shows a physical view or block diagram of a network topology extracted for Trace File MPOA01A.CAP, and FIG. 11 shows a logical view thereof as observed by an ATM Sniffer Expert System 2 of the present invention.

ATM LANE uses Flow (connection) components to tie the hosts of the ELAN together as described immediately below.

CFGDIR: Configuration Direct VCC which is setup by the LEC, to the LECS and is used to get the target LES (ELAN) address to which the LEC must join in order to become an active member of the ELAN. This is a point to point bi-directional flow, as shown in FIGS. 8, 9, and 11.

CTLDIR: Control Direct VCC is setup by the LEC to the LES and is used by the LEC to register or unregister LAN MAC addresses that the LEC represents (non-proxy), which are held in the LES cache, and to request LAN MAC LEC\ATM Address mappings (LE ARPs) used in the establishment of Data Direct flows. This is a point to point bi-directional flow, as shown in FIGS. 8, 9, and 11.

CTLDIS: Control Distribute VCC which is setup by the LES to all LECs which are connected to the same ELAN (LES). This is primarily used to distribute LEARPs to all LECs when a LAN MAC to LEC ATM Address mapping cannot be resolved. In which case the CTLDIS is setup up in response to the setup of the CTLDIR by the LEC. This is a unidirectional point to point or point to multipoint flow, as shown in FIGS. 8, 9, and 11.

MCS8023, MCS8025: Multicast Send VCC shown in FIGS. 8 and 11, is setup by the LEC to the BUS and is used to carry all broadcast, multicast, and unknown data flow from the LEC to the BUS and in some cases to distribute data which arrives at the BUS to specific LECs, in the case of unknown and multicast data frames, and to all LECs in the case of Broadcast data frames, which are attached to the BUS on the same ELAN. When a LAN MAC frame arrives at the LEC with a broadcast or multicast LAN MAC address it is sent to the BUS. This is a bidirectional point-to-point flow.

MCF8023, MCF8025: Multicast Forward VCC which is setup by-the BUS to each LEC which has established an MCS (Multicast Send) Flow to the BUS, and which carries all broadcast, multicast, and unknown data flow from the BUS to all attached LECs in the case of Broadcast data at specific LECs relative to unknown and multicast data. With reference to FIGS. 8 and 11, this is a unidirectional point to point or point to multipoint flow. Refer to FIGS. 1 and 4.

DD8023, DD8025: Data Direct VCC, as shown in FIG. 9, is setup between two LECs by one of the LECs in response to a data frame arriving at the LEC from the attached legacy LAN. A LAN frame with a destination LAN MAC address arrives at the LEC and the LEC issues a LEARP to the LES in order to get the ATM Address of the LEC which represents the destination MAC address. Once the LES returns the destination ATM LEC Address, the LEC sets up a Data Direct VCC to the target LEC and all unicast data which flows between the LAN MAC address pair is sent between the LECs via this VCC. Note that this VCC carries only unicast data (and some control data) and never multicast or broadcast data. This is a bi-directional point-to-point VCC.

Figure 11:
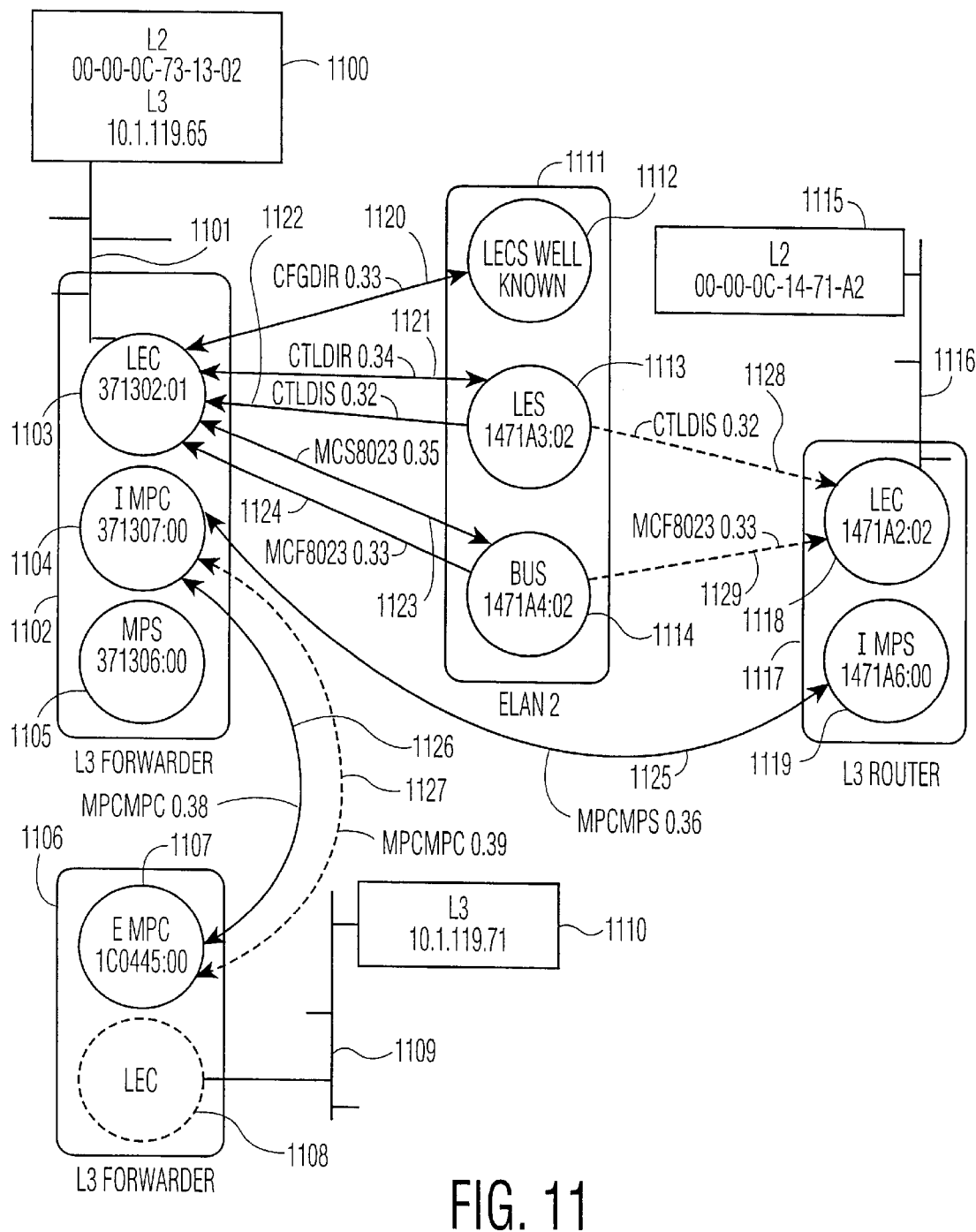
FIG. 11 is a diagram showing an example of a logical view of a network for captured trace file MPOAIA.cap as extracted by the present invention.

ATM MPOA uses flow (connection) components to tie the hosts: of separate and distinct ELANs together, as shown in FIGS. 9 and 11, and described immediately below.

MPCMPS: MPC to MPS control flow which is setup by the MPC to the MPS and is used by the MPC to issue Layer 3 destination resolution requests to the MPS and in turn receive resolution requests and replies from the MPS. This is a point to point bi-directional flow.

MPCMPC: MPC to MPC "Shortcut" VCC, which is data flow setup by the Ingress MPC to the Egress MPC. This is used to connect LECs that are on different ELANs or Subnets. This is a point-to-point uni or bidirectional flow. Refer to FIG. 4.

As previously mentioned, FIGS. 8, 9 and 11 illustrate the logical view of a LANE and MPOA application at work.

FIG. 10 shows the physical view of an MPOA\LANE application as found in the trace file 10 (see FIG. 1)MPOA01A.cap, whereas FIG. 11 illustrates the logical view.

The Expert Displays:

The Expert displays shown in FIGS. 12 through 22 consist of six main subwindows including:

(W1) Layer Selection Window 1200 shown at the far left of the display.

(W2) Object Summary Window 1201 shown at the top of the display.

(W3) Object Detail Window 1202 shown at the center right of the display.

(W4) Hierarchy Tree window 1203 shown at the center left of the display.

Figure 14:
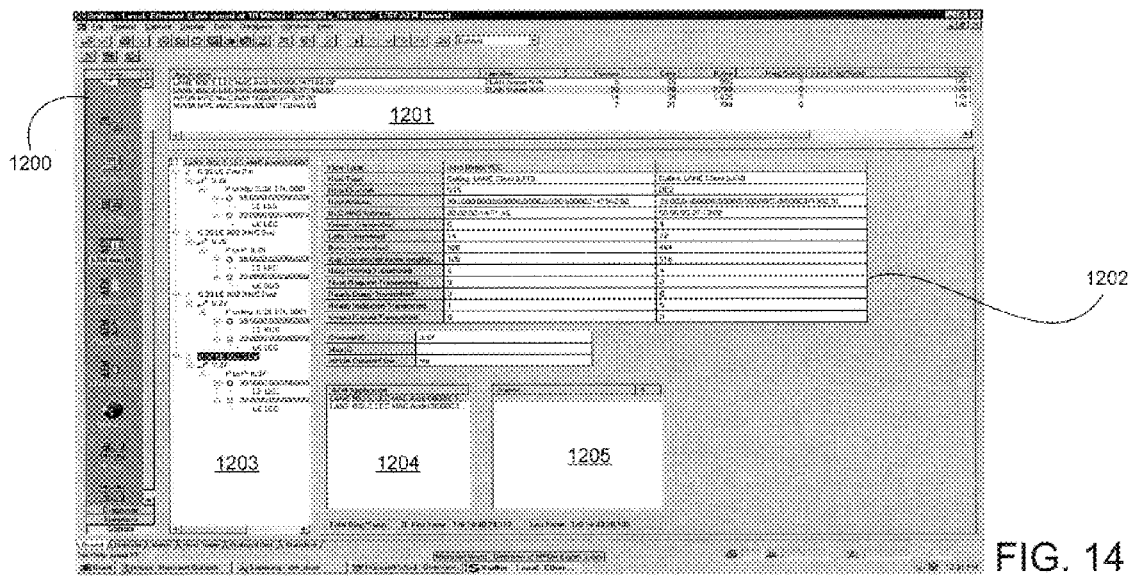

(W5) Drill Up Window 1204 shown at the lower center left of display (for example, see FIG. 14).

(W6) Alarms Window 1205 shown at the lower center right of display(For example; see FIG. 14).

Figure 12:
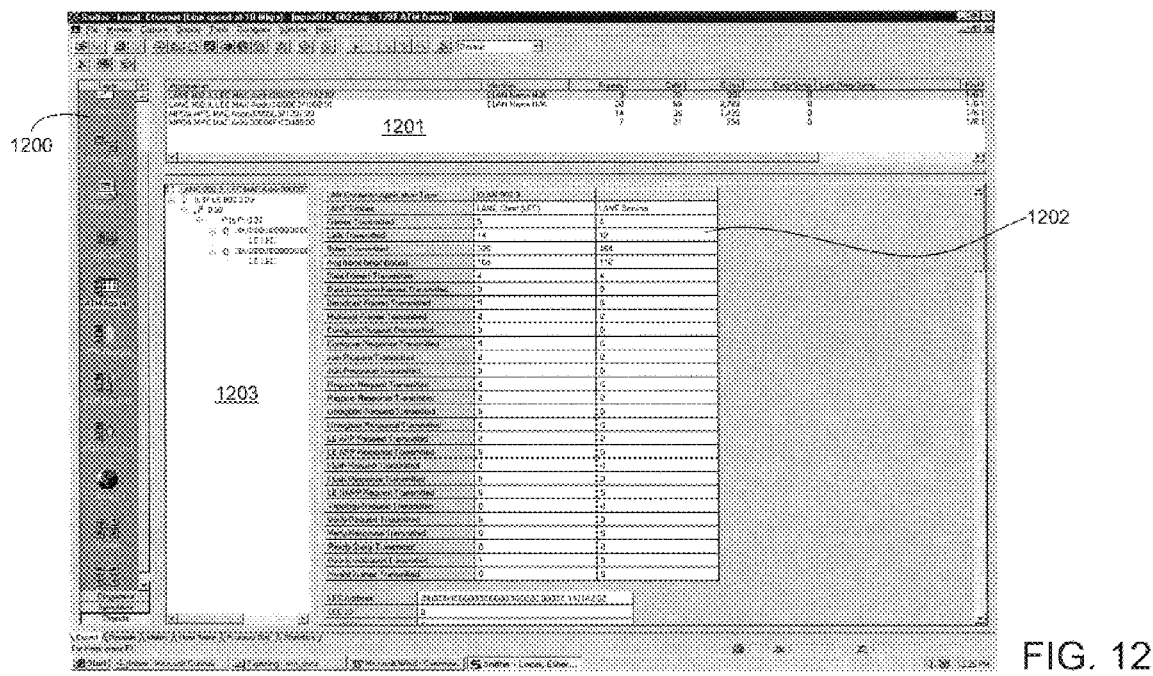
FIGS. 12 through 26 show examples of displays provided by the present ATM Sniffer Expert System of the present invention, these figures showing in chronological increasing order an ATM LANE application, ATM MPOA Application, ATM LANE Data Direct Flow, ATM MPOA MPC to MPS Flow, ATM Connection, ATM Sub Connection, ATM Host, ATM MPOA MPC Sub Host, ATM LANE LEC Sub Host, an example of a Flow Layer Alarm, a "Start Menu", Select Settings For Network Interface Card, Selection of trace file for "offline" analysis, Selection/start of "live" capture via a capture button, and Live capture presentation.
Figure 13:
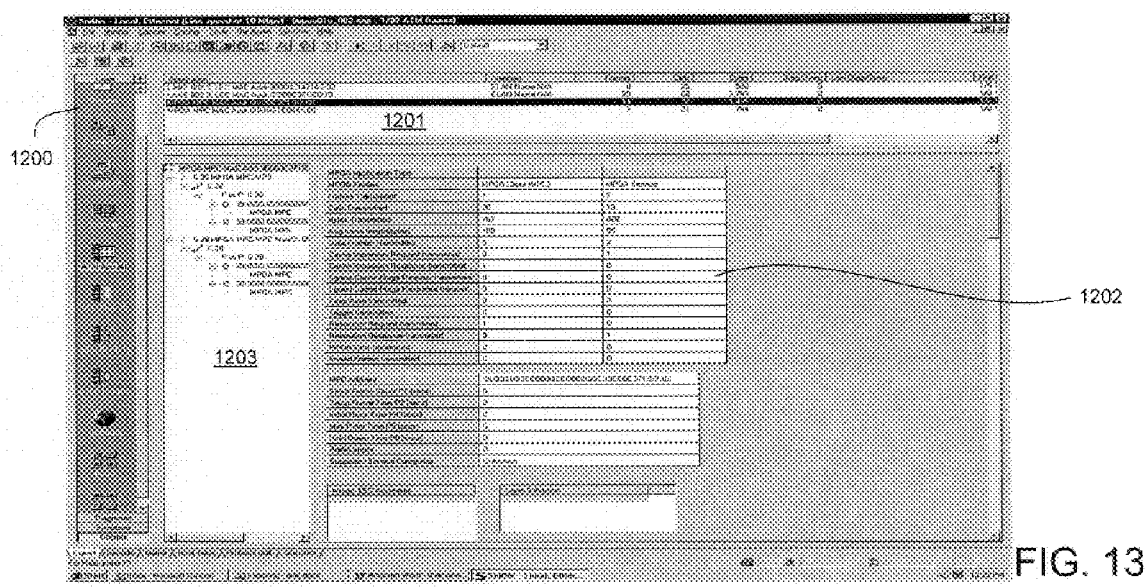

For example, in FIG. 13, the user selects a specific layer (ATM Application) using the mouse to select and right click a layer icon in the "Layer Selection Window" 1200. Objects that exist at the selected layer will be displayed in the "Object Summary Window" 1201 along with an information summary of the objects. Within the "Object Summary Window" 1201 the user selects a specific object and the associated object detail will be shown in the detail grid of the "Object Detail Window" 1202 (MPOA MPC MAC Addr:00000C371307:00 is selected\shown here). Objects attached to the selected object are shown in a hierarchical form in-the "Hierarchy Tree Window" 1203. The Hierarchy Tree 1203 is a pictorial view of the ATM Expert model on which this system is based. A generic view of the ATM Expert model is illustrated in FIG. 2. A specific example of the mapping of the MPOA application and related flows, and connections to the ATM model of FIG. 2 are illustrated in FIG. 7. The user may traverse the Hierarchy by selecting any of the objects, via the mouse, in the "Hierarchy Tree Window" with each selection affecting the contents of the detail grid shown in the "Object Detail Window" 1202. The user can "drill down" to the lower layers or "drill up" to the higher layers via the "Hierarchy Tree Window" 1203. The "Drill Up Window" 1204 allows the user to access the next higher layer in the hierarchy (not contained in the "Hierarchy Tree Window" 1203) if the higher layer object exists. Selection of an object in the "Drill Up Window" 1204 via a double click will cause the relevant higher layer Expert windows types W3 through W6 (list above) to be displayed. Note for FIGS. 12 and 13 the window types W5 and W6 are not shown due to the "Object Detail Window" size but can be accessed by using the mouse to scroll down (using the scroll bar at the right hand side of the window) the "Object Detail Window" 1202. All Expert object displays have the six-window types listed above. More detail is given below as each layer is reviewed along with associated figures.

An explanation will now be given of how the example synthesized from the frames contained in the ATM Sniffer trace file MPOA01A.CAP maps to the ATM Expert model of FIG. 2, as shown in FIGS. 7, and ultimately displayed in part to the user in FIG. 13. For this example the ATM Sniffer 2 was attached to an ATM network segment on which data connections shown in FIG. 11 including Configuration Direct VCC (CFGDIR 0.33) 1120, Control Direct VCC (CTLDIR 0.34) 1121, Control Distribute VCC (CTLDIS 0.32) 1122, Multicast Send VCC (MCS8023 0.35) 1123, Multicast Forward VCC (MCF8023 0.33) 1124, MPOA Client to Server VCC (MPCMPS 0.36) 1125, MPOA Client to Client VCC (MPCMPC 0.38) 1127, and Signaling channel 0.5 (not shown) were detected.

For the sake of brevity only the MPOA specific flows extracted from the data stream and mapped to the ATM Expert Model are shown in FIG. 7. FIG. 11 shows the various objects extracted from the ATM data stream by the Sniffer Expert System 2. Note: For the sake of brevity the ATM Host addresses attached to the various Host\Sub-Host pairs (e.g. LEC 1103, I MPC 1104, etc) as shown in have been truncated from the true 20 byte (40 decimal numerals) that constitute a unique ATM Host Address. In the actual ATM Expert displays (e.g. FIG. 13) as well as the internal ATM Host object keying the entire 20 byte ATM Address is used, the Layer 3 Forwarder 1102 is strictly a visual device meant to imply a close association between the LAN Emulation Client (LEC) 1103 (see FIG. 11), the Ingress MPOA Client (I MPC) 1104, and the MPOA Server (MPS) 1105 and as such there is no equivalent object for the Layer 3 Forwarder provided in the ATM Expert model.

The objects shown in FIG. 11, including LEC 1103, I MPC 1104, MPS 1105, E MPC 1107, LAN Emulation Configuration Server (LECS) 1112, LAN Emulation Server (LES) 1113, Broadcast\Unknown Server (BUS) 1114, LEC 1118, and I MPS 1119 are meant to represent a combination of the ATM Expert Model (FIG. 2) Host and Sub Host Layer objects. For example I MPS 1471A6:00 1119 "maps" to a Host Layer object (FIG. 2) with ATM Address 1471A6:00 (truncated) as shown in FIG. 7 as Host 2 and has attached below it an MPS type Sub Host object (FIG. 2) as shown in FIG. 7 as Sub-Host 2.

The objects shown FIG. 11 including Configuration Direct VCC (CFGDIR 0.33) 1120, Control Direct VCC (CTLDIR 0.34) 1121, Control Distribute VCC (CTLDIS 0.32) 1122, Multicast Send VCC (MCS8023 0.35) 1123, Multicast Forward VCC (MCF8023 0.33) 1124, MPOA Client to Server VCC (MPCMPS 0.36) 1125, MPOA Client to Client VCC (MPCMPC 0.39) 1126, MPOA Client to Client VCC (MPCMPC 0.38) 1127, Control Distribute VCC (CTLDIS 0.32) 1128, and Multicast Forward VCC (MCF8023 0.33) 1129 represent a combination of the ATM Expert Model (FIG. 2) Sub Connection Layer, Connection Layer, and Flow Layer objects. For example, the MPOA Client to Server VCC (MPCMPS 0.36) 1125 maps to a Flow Layer Object (FIG. 2) with type MPCMPS as shown in FIG. 7 as MPCMPS Flow 1, and has attached below it a Connection Layer object which maps 0.36 to a Cnx Object (FIG. 2) as shown in FIG. 7 as Cnx 1 0.36, and finally attached below the Connection Layer object is the Sub Connection object 0.36 which is mapped to a Sub Connection Layer object Sub Cnx 1 (FIG. 2) as shown in FIG. 7 as Sub Cnx 1 End Reference Number (ERN) 00.

Referring to FIG. 11, the source workstation 1100 at layer 2 MAC address 00-00-0-C73-13-02\layer 3 station address 10.1.119.65 wishes to send data frames to the destination workstation 1110 at layer 3 station address 10.1.119.71. The source workstation 1100 is aware that the destination workstation 1110 is not on the same layer 3 subnet and thus must send its frames to the Layer 3 Router 1117 by using the Layer 3 Routers's 1117 Layer 2 destination address (not shown).

The frames are sent by the source workstation 1100 over the Ethernet segment 1101 to the Layer 3 Forwarder 1102 where the LEC 1103 at ATM address 371302:01 receives the frames. The I MPC 1104 associated with the LEC 1104 also interrogates the frame and determines that the destination MAC address is that of the I MPS 1119 in the Layer 3 Router 1117. Meanwhile the LEC 1103 must setup a data connection to the LEC 1118, and in order to do this must first join the Emulated LAN 1111. The LEC 1103 issues Signaling frames over the signaling channel 0.5 (not shown) to the LECS 1112. The Signaling Setup frame contains the LECs 1103 ATM Address (371302:01) as the Calling address and the LECS 1112 ATM Address (Well-Known Address) as the Called address. The ATM Expert extracts the Calling and Called ATM addresses, the BLLI PID=1, and Connection Channel number from the Signaling Frames and creates the Connection Layer object 0.33 (1120), the Sub Connection layer object ERN 00 (1120) (attached below the Connect Layer Object), the Host Layer objects at the ATM Addresses 371302:01 (1103) and "Well-Known" (1112) (both attached below the Sub Connection Layer object), the Sub Host Layer objects LEC (1103) and LECS (1112) (attached below the respective Host Layer Objects), the Flow Layer object Configuration Direct VCC (CFGDIR 0.33) 1120 (attached above the Connection Layer object), and finally the Application Layer object is created for the LEC 1103 (attached above the Flow Layer Object). The LEC 1103 then issues a Configuration Request frame to the LECS 1112 via the CFGDIR 0.33 VCC 1120 and the LECS 1112 issues a response containing the ATM Address of the LES 1113. The LEC 1103 having received the desired addresses for the LES 1113 now issues Signaling Setup frames to the LES 1113 using its ATM Address as the calling address and the ATM Address of the LES 1113 as the called address. As a result the Control Direct Flow (CTLDIR 0.34) 1121 is established between the LEC 1103 and LES 1113 and the ATM Expert, in the same manner as with the CFGDIR 0.33 VCC (1120), creates the Connection Layer object 0.34 (1121), Sub Connection Layer Object ERN 00 (1121) (attached below the Connection Layer object), Host object at ATM Address 1471A6:00 (1119) (attached below the Sub Connection Object), and Sub-Host Layer object (1119) (attached below the Host Layer object). Since the LEC 1103 initiated the CTLDIR 0.34 setup, the existing Host object for the LEC 1103 is attached below the Sub Connection Layer Object ERN 00 which is itself attached to the Connection Layer Object 0.34 1121. The Flow Layer Object CTLDIR VCC 0.34(1121) is created and attached to the bottom of the existing Application Layer Object for the LEC 1103 since this same LEC is attached to the CTLDIR 0.34 flow 1121. For the sake of brevity the detection of the remaining LAN Emulation control flows including CTLDIS 0.32 1122, MCS8023 0.35 1123, and MCF8023 0.33 1124 is achieved in a manner similar to the CFGDIR 0.33 1120 and CTLDIR 0.34 1121 flows, and the associated ATM Expert objects and inter-object links are likewise created. Thus the LEC 1103 is now a member of the Emulated LAN. The LEC 1103 learns the ATM Address of the I MPS 1119 associated with the destination LEC 1118 via the contents of the LAN Emulation control frames which are passed between the LEC 1103 and the LEC 1118.

To create the data flow to the target Layer 3 Router 1117 via the LEC 1118, the source LEC 1103 must obtain the destination LEC 1118 ATM Address. The source LEC 1103 issues an LEARP Request frame to the LES 1113 over the CTLDIR 0.34 VCC 1121. The LES 1113 forwards this LEARP Request frame to LEC 1118 via the CTLDIS 0.32 VCC 1128. The destination LEC 1118 returns its ATM Address (1471A2:02) in an LEARP Response frame to the LES 1113 via a CTLDIR VCC (not detected by ATM Expert and thus not shown here) and the LES 1113 in turn forwards the frame to the source LEC 1103 via either the CTLDIR 0.34 VCC 1121 or CTLDIS 0.32 VCC 1122. The source LEC 1103 having received the destination LECs 1118 ATM Address now signals a Data Direct DD8023 VCC (not seen by the ATM Expert in this example and thus not shown in this Figure) to the destination LEC 1118. Once the DD8023 VCC is established, the source LEC 1103 sends its data frames to the destination LEC 1118. The Layer 3 Router then establishes communication to the destination workstation 1110 at station address 10.1.119.71 via a route unseen and thus unknown to the ATM Expert.

As previously stated, the I MPC 1104 associated with the LEC 1103 or the Layer 3 Forwarder 1102 monitors the traffic received by the LEC 1103 and sent to the LEC 1118 of the Layer 3 Router 1117. When the number of data frames detected exceeds a threshold value programmed into the IMPC 1104 (via network manager), the IMPC I 1104 attempts to create a shortcut data flow between itself and the EMPC 1107 contained in the Layer 3 Forwarder 1106, which represents the destination workstation 1110. In order to create the shortcut data flow the I MPC 1104 must determine the ATM Address of the E MPC 1107 as follows. The I MPC 1104 issues Signaling Setup Frames to the I MPS 1119 using its ATM Address (371307:00) as the called address and the ATM Address (1471A6:00) (learned earlier) of the I MPS 1119 to create the MPOA Client to Server MPCMPS 0.36 VCC 1125. As with the LAN Emulation control flows, the ATM Expert 2 detects the signaling frames and creates the following objects: Connection Layer Object 1125 as Cnx 1 0.36 as shown in FIG. 7, Sub Connection Layer object 1125 as Sub Cnx 1 ERN 00 as shown in FIG. 7 and attached below the Connection Layer object, Host Layer objects 1104 and 1119 as Host 1 00000C371307:00 and Host 2 00000C1471A6:00, respectively, as shown in FIG. 7, and attached below the Sub Connection Layer object, Sub-Host Layer objects I MPC 1104 and I MPS 1119 as Sub-Host 1 MPC and Sub-Host 2 MPS (FIG. 7), respectively, attached below the respective Host 1 and Host 2 (FIG. 7) Layer objects, Flow Layer object 1125 as shown as MPCMPS Flow 1 in FIG. 7 attached above the Connection Layer object 1125, and finally the Application layer object as shown as MPOA App 1 00000C371307:00 in FIG. 7. Through an exchange of MPOA Resolution Request frames the source IMPC 1104 learns the ATM address of the destination E MPC 1107 and thus issues Signaling Setup frames to the E MPC 1107 to create the "Shortcut Data Flow" MPCMPC 0.38 1127. As with the MPCMPS flow 1125 the following ATM Expert 2 objects are created: Connection Layer Object 1127 las Cnx 1 0.38 as shown in FIG. 7, Sub Connection Layer object 1127 as Sub Cnx 2 ERN 00 as shown in FIG. 7 and attached below the Connection Layer object, Host Layer object 1107 as Host 3 00E04F1C04 as shown in FIG. 7 and attached below the Sub Connection Layer object, Sub-Host Layer object EMPC 1107 as Sub-Host 3 (FIG. 7), attached below Host 3 (FIG. 7) Layer object, Flow Layer object 1127 as shown as MPCMPC Flow 2 in FIG. 7 attached above the Connection Layer object 1127, and finally the Application layer object as shown as MPOA App 2 00E04F1C0445:00 in FIG. 7 attached above the Flow layer object 1127. Note: The Host/Sub Host layer Object pair (Host1/Sub-Host 1 FIG. 7) were created along with the MPCMPS flow 1125 and are not recreated here but rather the Host 1 object is attached below the Sub Connection Layer object (Sub Cnx 2 ERN 00) as shown in FIG. 7.

Once the MPCMPC 0.38 VCC 1127 has been created the data flow from the source LEC 1103 is now rerouted from the Data Direct VCC (not shown) to the "Short Cut" MPCMPC 0.38 VCC 1127 thus effectively "connecting" the two distinct subnets for workstations 10.1.119.65 1100 and 10.1.119.71 1110 with a single "hop" or link and replacing a multi-hop routed flow.

Further correlation of the aforementioned objects can be made to the actual ATM Expert display shown in FIG. 13, relative to FIGS. 7 and 11. Referring to the "Hierarchy Tree Window" 1203 in FIG. 13 the reader can see the visual representation of the present ATM Expert Model as it applies to the MPOA objects extracted from the data stream of the current example. The MPOA Application object 00000C371307:00 is shown as the first item at the top of the "Hierarchy Tree". Beneath the MPOA Application are the two MPOA flow objects 0.36 MPOA MPCMPS 1125 (see FIG. 11) and 0.38 MPCMPC 1127 which originate from the same MPC object (IMPC 1104). Note: In this view of the "Hierarchy Tree Window" 1203 all ATM Expert Layers are exposed and it is understood that items that start at the same leftmost columnar position in the window are at the same level in the hierarchy, and each successive lower layer is shown with an increasing rightward position as well as a lower position in the window. For example MPOA MPC MAC addr 00000C371307:00 represents the Application Object (see FIG. 7) at the top of the Hierarchy and is thus at the leftmost position in the "Hierarchy Tree Window" 1203. The flow objects 0.36 MPOA MPC-MPS and 0.38 MPOA MPC-MPC occupy different (and lower) row positions yet the same columnar position which is shifted slightly rightwards from the MPOA application object occupying the next higher layer. Continuing, the Connection Layer object 0.36 is below and to the right of the higher layer MPCMPS flow object, the Sub Connection Layer object P to P:0.36 is shown below the higher layer 0.36 connection object, the source or calling Host layer object 371307:00 1105 (shown here as 39:0000:000000000 which is occluded by the limited size of the "Hierarchy Tree Window" 1203 and in its entirety would be read as 39:0000:0000000000000002022C:00000C371307:00 which is the full 20 byte address of the MPC), which is shown below the higher layer Sub Connection P to P:0.36 object, and finally the Sub-Host Layer object MPOA MPC which is shown below its higher layer Host Layer object. Retracing the steps to the Sub Connection Layer object P to P 0.36 and moving skipping the first Host/Sub-Host object pair, the "called" Host Layer object 1471A6:00 1119 (shown here as 39:0000:000000000 but actually 39:0000:0000000000000002022C:00000C1471A6:00) and finally the Sub-Host Layer object MPOA MPS which is shown below its higher layer Host Layer object.

There are four summary level displays for the ATM Sniffer Expert 2 of the invention, which are represented by four respective icons in "Layer Selection Window" 1200, as follows:

A). ATM Application: LANE and MPOA App are available.

B). ATM Flow: All flows (over connections) which have been detected and typed including multiplexed and non-multiplexed flows.

C). ATM Connections: All channels that have been detected including PVC or SVC type D). ATM Host: All end stations that reside on either side of a connection.

With further reference to FIG. 13, there are six levels or layers of detail display available for ATM Expert or Sniffer 2, as previously described. Note that access to the two "sub layers", namely Sub Connection, and Sub Host, is restricted to the "Hierarchy Tree Window" 1203, whereas the other layers are accessible via the "Hierarchy Tree Window" 1203 or the "Object Summary Window" 1201. Further details are provided immediately below.

a). ATM Application Layer: The LANE App provides a "LEC's eye view" of the ELAN to which it is attached. It contains a summary of all data and control frames detected on all of the flows to which the LEC is attached as well as some relevant details as to the LECs identity and configuration. The hierarchy tree on the lower left of the display (see FIG. 12) shows all the flows, which have been detected between this LEC and the LE Service as well as any data flows to other LECs (if available). Additional detail on any flow and attached station can be found by traversing the hierarchy tree. The DLC (Data Link Connection) object list box (not shown) contains a list of all LAN MAC (Media Access Control) addresses that are represented by this LEC and allows the user to drill upwards into the LAN Expert by double clicking the desired MAC address. Alarms that have been detected at the Application Layer or Level are also displayed in an alarm list box (not shown). FIG. 12 provides an example of the LANE Application as displayed by the ATM Sniffer Expert system 2.

The MPOA Application (Multiprotocol Over ATM Application) provides an "MPC's eye view" of the network to which it is attached, as shown in FIG. 13 for an example of a display of an MPOA Application as derived by the present ATM Sniffer Expert System 2. It contains a summary of all data and control frames detected on all of the flows to which the MPC (MultiProtocol Client) is attached as well as some relevant details as to the MPC's identity and configuration. The hierarchy tree 1203 on the left of the display shows all the flows, which have been detected between this MPC and the MPS (MultiProtocol Server) as well as any-shortcut data flows to other MPC's (if available). Additional detail on any flow and attached Host can be found by traversing the hierarchy tree. The station object list box (not shown) contains a list of all LAN Layer 3 addresses represented by this MPC and allows the user to drill upwards into the LAN Expert by double clicking the desired Layer 3 address. Alarms that have been detected at the Application level are displayed in an alarm list box that although not shown in FIG. 13, is available to the user by scrolling down the object octal window W3.

Figure 15:
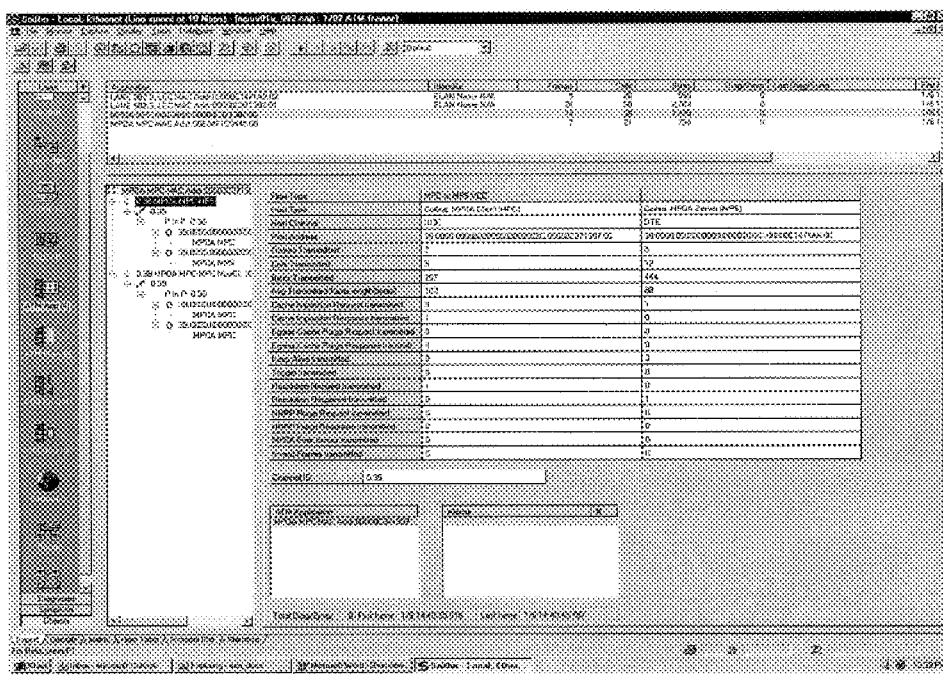
Figure 16:
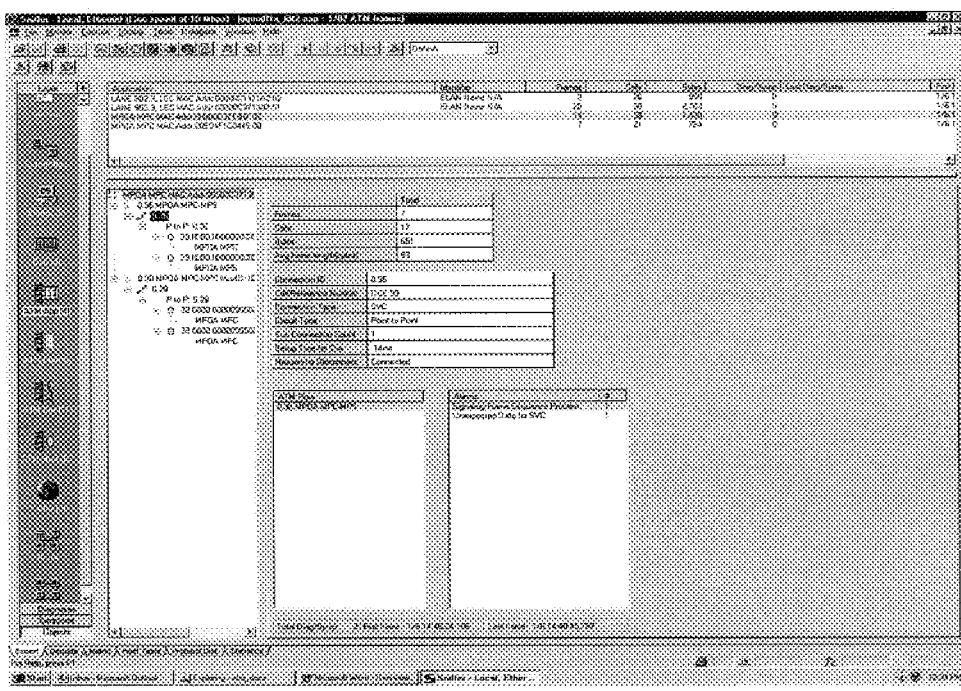
Figure 17:
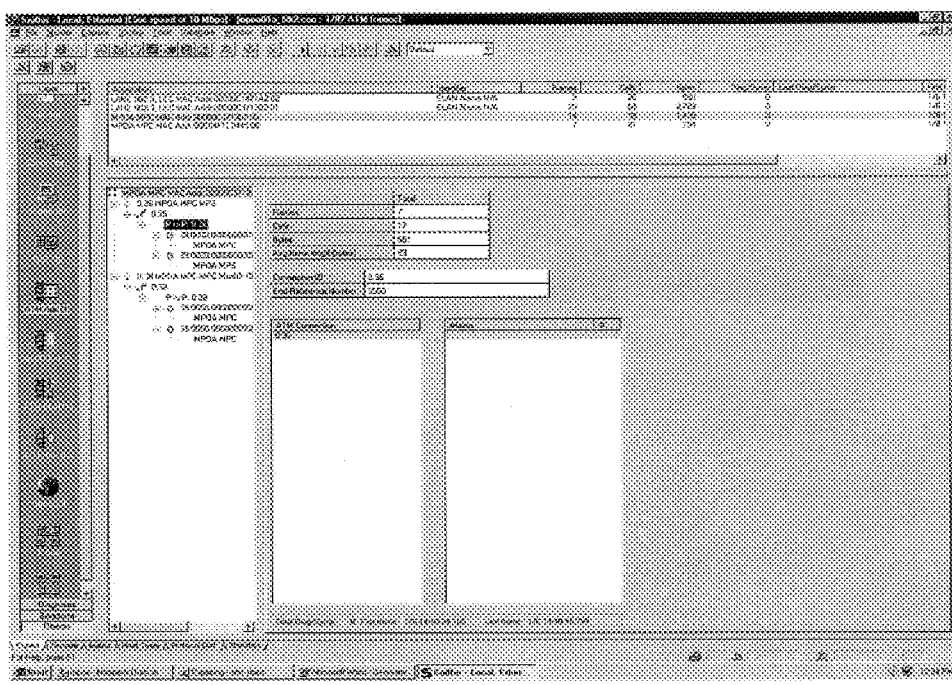
Figure 18:
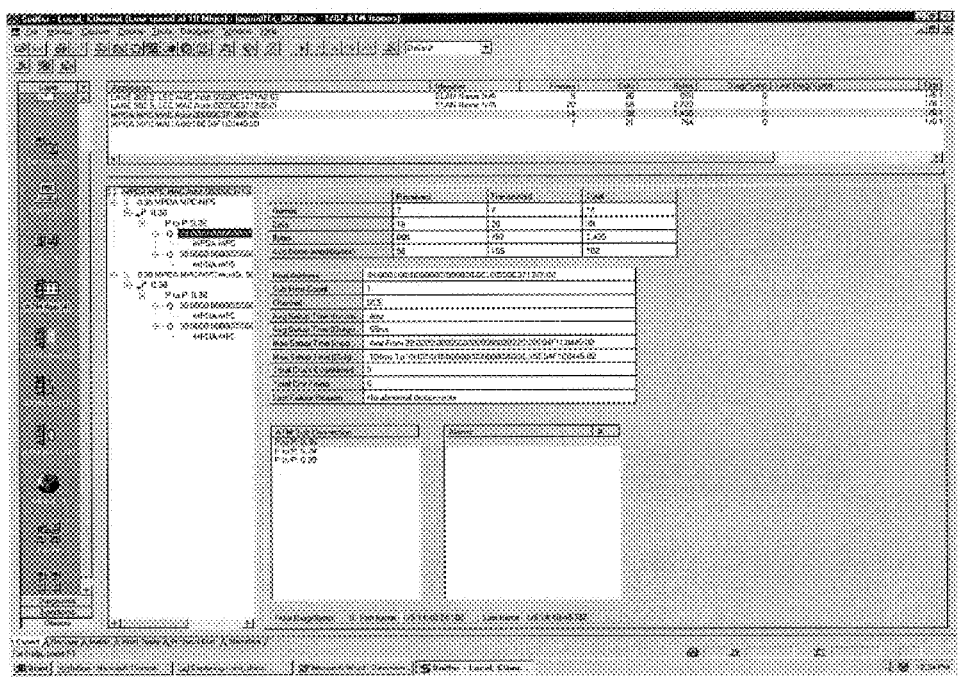
Figure 19:
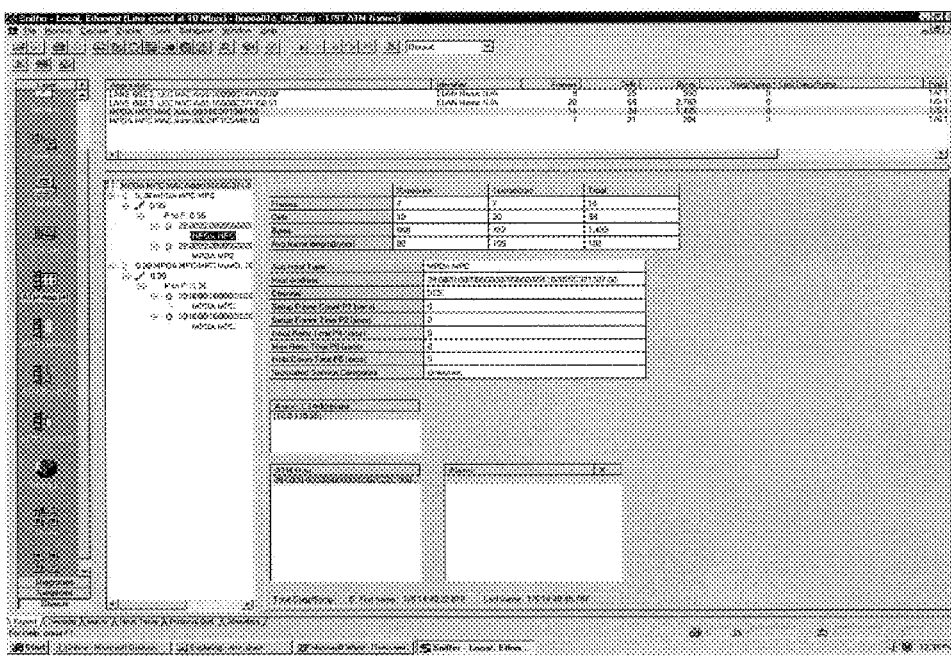
Figure 20:
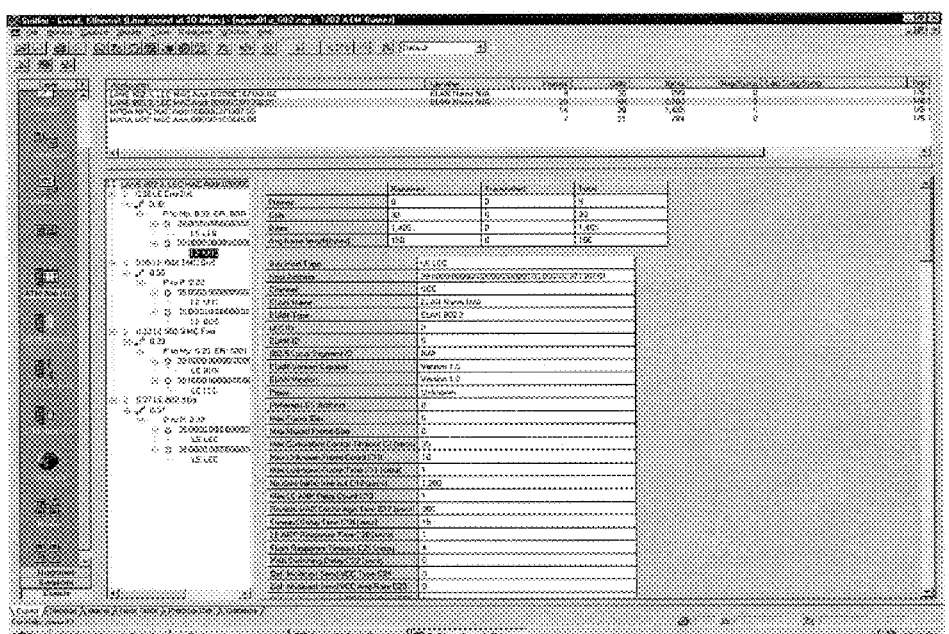

In FIG. 13 the user has selected the ATM Application layer object MPOA MPC MAC Address 00000C371307:00 (in the "Object Summary Window" 1201) and as a result the detail for this object is shown in the "Object Detail Window" 1202 grid. The grid contains statistics specific to the selected MPOA MPC Application object including frame, cell, and byte counts along with counts of specific frame types (e.g. Trigger) that have been transmitted by the associated MPC or by the MPOA Service to which this MPC is attached. This grid contains a summary of all frame types seen by the associated MPC that have been culled from the two flows that are attached to this MPC Application, namely MPOA MPC-MPS 0.36 and MPOA MPC-MPC 0.38. The attachment of these flows can be seen in the "Hierarchy Tree Window" 1203 for this Application.

b). ATM Flow Layer: This Layer contains summary and object details of all detected flows. Drill up to the application layer is provided via the ATM Application list box with drill down provided by the hierarchy tree. Alarms, which have been detected at this level, are available for display via the alarm list box. Current flow types include CFGDIR, CTLDIR, CTLDIS, MCS8023, MCS8025, DD8023, DD8025, MPCMPC, and MPCMPS. FIGS. 14 and 15 show examples of a display of the DD8023 and MPCMPS flow as displayed by the ATM Sniffer Expert system 2. In FIG. 15 the user has "drilled down" to the attached MPOA MPC-MPS 0.36 flow by selecting the flow at the next layer down in the "Hierarchy Tree Window" 1203 for the MPOA Application object (FIG. 13), and consequently the object detail grid for the MPCMPS flow on 0.36 is shown. This grid contains statistics specific to the MPC-MPS flow including frame, cell, and byte counts along with counts of specific frame types (e.g. Keep Alive) that are detected on this flow between the MPC and MPS host entities.

c). ATM Connection Layer:.This Layer contains details specific to a given connection (VCC) including statistics, alarms and number of Sub Connections (leafs/parties etc) which are attached to this connection. FIG. 16 provides an example of an ATM Connection as displayed in the ATM Sniffer Expert system 2. Alarms, which have been detected at the connection level, are available for display via the alarm list box. Point to multipoint. Sub Connections are detailed by the Sub Connection count (as displayed) greater than one and the hierarchy list box showing more than one Sub Connection beneath the connection icon, in addition the connection icon will show "P to P" or "P to MP" labels along with the connection ID. Drill up to the flow layer is provided via the ATM Flow list box with drill down provided by the hierarchy tree. Current connection types include PVC (Permanent Virtual Connection) and SVC (Switched Virtual Connection). In FIG. 16, the user has "drilled down" to the attached Connection object 0.36 by selecting the connection 0.36 at the next layer down in the "Hierarchy Tree Window" 1203 for the MPCMPS Flow object (see FIG. 15), and consequently the object detail grid for the Connection 0.36 is shown. This grid contains statistics specific to the Connection including frame, cell, and byte counts along with other relevant statistics extracted from the data on the connection.

d). ATM Sub Connection Layer: This Layer contains detail specific to a given Sub Connection or Virtual Channel Connection (VCC) including statistics and alarms. Sub Connections bind two ATM end stations together. FIG. 17 provides an example of an ATM Sub Connection as displayed in the ATM Sniffer Expert system 2. Sub Connections which are a leaf on a point to multipoint connection will use both the connection ID (VPI/VCI) or (Virtual Path Identifier/Virtual Channel Identifier) along with the end reference number to distinguish one leaf from another. Alarms, which have been detected at the Sub Connection level, are available for display via the alarm list box. Drill up to the connection layer is provided via the ATM Connection list box with drill down provided by the hierarchy tree. Current Sub Connection types include SUBCNX. In FIG. 17, the user has "drilled down" to the attached Sub Connection object P to P 0.36 by selecting the Sub Connection P to P 0.36 at the next layer down in the "Hierarchy Tree Window" 1203, for the 0.36 Connection object (see FIG. 16), and consequently the object detail grid for the Sub Connection is shown. This grid contains statistics specific to the Sub Connection including frame, cell, and byte counts.

e). ATM Host Layer: This Layer contains details specific to a given ATM end station including statistics, alarms, and counts of Sub Hosts attached. FIG. 18 shows an example of an ATM Host as displayed by the ATM Sniffer Expert System 2. Sub Hosts exist by virtue of the fact that for LANE and MPOA several different station types can share the same ATM address (including the Selector byte) and the device switches frames internally based on the frames opcode e.g. BUS (Broadcast and Unknown Server) and LES commonly share the same ATM address yet neither shares the same frame types. Note that Sub Hosts of the same type cannot coexist on the same host. A Host object with multiple Sub Hosts is considered a Mux'ed host. The attached mux'ed Sub Hosts can be seen in the hierarchy tree using drill down. Host objects that have been created in response to the detection of PVC connections will not use the ATM End station address as the identifier but rather an ID which consists of the link side Data Terminal Equipment/Data Communication Equipment (DTE/DCE) followed by the channel ID (e.g. PVC signaling channel on connection 0.5 has two hosts identified as DCE.0.5 and DTE.0.5 Hosts) created in response to the detection of a signaled channel shall use the twenty byte ATM End station address (e.g. 39:0000:00000000000000000000:123456789101:01) extracted from the signaling setup and ADD party frames. Alarms, which have been detected at the host level, are available for display via the alarm list box. A host can be attached to many Sub Connections (e.g. a LEC with Sub Connection representing flows\subflows for CFGDIR, CTLDIR, CTLDIS etc). Drill up to the Sub Connection layer is provided via the "ATM Sub Connection" list box with drill down provided by the hierarchy tree. Current host types include Mux'ed (Multiplexed) and non-Mux'ed. In FIG. 18, the user has "drilled down" to one of the attached Host objects 39:0000:0000000000000002022C:00000C371307:00 by selecting the host at the next layer down in the "Hierarchy Tree Window" for the point-to-point 0.36 Sub Connection object (FIG. 17), and consequently the object detail grid for this Host object is shown. This grid contains statistics specific to the Host including frame, cell, and byte counts along with other relevant statistics extracted from the data, which is transmitted by the related ATM Host entity.

f). ATM Sub Host Layer: This Layer contains details specific to a given Sub Host residing at an ATM end station. FIG. 19 provides an example of an ATM MPOA MPC Sub Host as displayed in the present ATM Sniffer Expert system 2. Alarms, which have been detected at the Sub Host level, are available for display via the alarm list box. Drill up to the host layer is provided via the ATM Host list box with drill down provided by the hierarchy tree. A Sub Host MAY NOT be attached to more than one host. Current Sub Host types include LECS, LEC, LES, BUS, MPC, and MPS. Note that FIG. 20 provides an example of an ATM LANE LEC Sub Host as displayed in the present ATM Sniffer Expert System 2. In FIG. 19, the user has "drilled down" to the attached Sub Host object MPOA MPC by selecting the Sub Host MPOA MPC at the next layer down in the "Hierarchy Tree Window" 1203 for the ATM Host object (see FIG. 18) and consequently the object detail grid for this Sub Host object is shown. This grid contains statistics specific to the Sub Host including frame, cell, and byte counts along with other relevant statistics extracted from the data, which is transmitted by the related ATM Host entity which contains this "Sub Host" functionally.

Alarms

The following is a list of representative alarm conditions detected and consequent alarms generated by the present ATM Sniffer Expert 2, but this list is not complete, and only represents a portion of the alarms obtainable.

a. ATM APP Layer Alarm Conditions

Data Direct Virtual Channel Connection (DDVCC) Idle Period Exceeds VCC Time out C 12:

The ATM Sniffer Expert System 2 generates this alarm when the Data Direct VCC is idle (no traffic) for longer than C12 seconds.

DDVCC Not Created In Response To LE_ARP (LAN Emulation Address Resolution Protocol):

When the LEC issues LE_ARPs the expectation is that it wants to establish a Data Direct VCC and in response to a successful LE_ARP the DDVCC setup should be attempted. The Sniffer Expert System 2 issues this alarm when the LEC fails to initiate the setup of a Data Direct VCC upon receipt of a successful LE_ARP.

Default MCSVCC Not Created In Response To LE_ARP:

The Sniffer Expert System 2 generates this alarm when the LEC fails to create the Multicast Send VCC in response to a successful LE_ARP for destination MAC address FF-FF-FF-FF-FF-FF.

Default MCFVCC Not Created In Response To LE_ARP:

The Sniffer Expert System 2 generates this alarm when the BUS fails to create the Multicast Forward VCC in response to a successful LE_ARP for destination MAC address FF-FF-FF-FF-FF-FF or if the LEC is not attached to an existing MCFVCC via AddParty.

Excessive Unknown Frames issued By LEC:

The Sniffer Expert System 2 generates this alarm when the LEC continues to issue Unknown frames to the BUS without issuing LE_ARPs to setup the Data Direct path to the target LEC.

LANE Config Phase Failure:

During the Configuration phase of LAN Emulation communications, a LEC sends a Configure Request frame to the LECS in order to obtain configuration information, including the address of a LES for an ELAN that meets the LEC's needs. In response, the LECS sends the Configure Response frame indicating whether the candidate LEC will be allowed to attempt the Join phase with a LES. The Expert generates this alarm when the Configure Response frame sent from the LECS to the LEC indicates failure (that is, the LEC will not be allowed to attempt the Join phase).

LANE Config Restart Delay>Max Reconfig Delay C38:

During the Configuration phase of LAN Emulation communications, a LEC sends a Configure Request frame to the LECS in order to obtain configuration information, including the address of a LES for an ELAN that meets the LEC's needs. If the Configure Request is denied, the LEC must wait for an interval before restarting the Configuration process. This interval can be any random value between the two LEC initial state parameters C38 (Maximum Reconfigure Delay) and C37 (Minimum Reconfigure Delay). Unfortunately, these two initial state parameters are not carried in the data stream, so the present system 2 cannot learn these parameters from analyzing traffic. Because of this, it uses the Maximum Reconfigure Delay C38 threshold in an Expert Options dialog box display of the ATM Sniffer Expert System 2 to specify when the LANE Config Restart Delay>Max Reconfig Delay C38 alarm should be generated. If a LEC waits longer than the time specified by this threshold, the Expert will generate this alarm. By default, the Maximum Reconfigure Delay C38 threshold is set to the standard value for C38 specified by the ATM Forum—five seconds.

LANE Config Restart Delay<Minimum Reconfig Delay C37:

During the Configuration phase of LAN Emulation communications, a LEC sends a Configure Request frame to the LECS in order to obtain configuration information, including the address of a LES for an ELAN that meets the LEC's needs. If the Configure Request is denied, the LEC must wait for an interval before restarting the Configuration process. This interval can be any random value between the two LEC initial state parameters C38 (Maximum Reconfigure Delay) and C37 (Minimum Reconfigure Delay). Unfortunately, these two initial state parameters are not carried in the data stream, so the present Expert system 2 cannot learn them from analyzing traffic. Because of this, it uses the Minimum Reconfigure Delay C37 threshold in an Expert Options dialog box displayed by the expert system 2 to specify when the LANE Config Restart Delay<Minimum Reconfig Delay C37 alarm should be generated. If a LEC restarts the configuration phase before the Minimum Reconfigure Delay C37 timer has expired, the Expert system 2 will generate this alarm. By default, the Minimum Reconfigure Delay C37 threshold is set to the standard value for C37 specified by the ATM Forum—one millisecond.

Failure to initiate shortcut following excessive default flow:

This alarm is generated when the MPC has forwarded>= MPC-p1 (Shortcut-Setup Frame Count) numbers of frames for a given Layer 3<Src Dst>pair and has not issued an Resolution Request.

Shortcut Create Failed Following MPOA Resolution Response:

The Expert system 2 generates this alarm when an MPC fails to create a shortcut for a given Layer 3<Src, Dst>pair when a successful MPOA Resolution Reply has been received and the associated "Shortcut-Setup Frame Count (MPC-p1) has been exceeded.

Frames Observed on Default Flow After Shortcut Active:

The Expert System 2 generates this alarm when a shortcut has been successfully created for an Layer 3<Src, Dst. Pair yet the Layer 3 packets are still seen over the default flow.

Data Frames Detected Following Data Plane Purge:

The Expert system 2 generates this alarm when the shortcut flow is not terminated following the detection of a Data Plane Purge (on the shortcut) or NHRP-purge request (as seen on the MPC-MPS control flow).

Attempt to Bind Layer 3 Address to Multiple MPOA Devices:

The Expert system 2 generates this alarm when an attempt is made to bind an LEC to multiple MPC's or MPS's, which is a MPOA spec violation. The converse however is valid, where multiple LECs can be bound to a single MPS or MPC.

b. ATM Flow Layer Alarm Conditions

ARE or STE Frames on Data Direct VCC:

When a LEC is emulating a token ring (that is , an 802.5 LEC) that uses source routing, it will occasionally need to send Token Ring All Routes Explorer (ARE) and Spanning Tree Explorer (STE) frames. Since these frames typically need to be sent to more than one destination, LAN Emulation requires that they be sent to the ELAN via the BUS (over a multicast send VCC). The Expert generates this alarm when it sees an ARE or STE frame on a data direct VCC (a violation of the LAN Emulation standard).

ARP Request Multi Queued:

A LAN Emulation entity resent an ARP request with the same Transaction ID as the original ARP request. This is a violation of the LAN Emulation standard. LAN Emulation communications are established and managed using a set of standard request and response control frames (such as Configure, Join, Register, Unregister, ARP, Flush, and Verify, among others). Each of these requests has a Transaction ID field. When the station receiving the request returns its response, it preserves this Transaction ID. In this manner, the requesting station can tell which responses correspond to which of its requests (by matching the Transaction IDs). Whenever a LAN Emulation entity needs to resend a request (perhaps because there was no response), it must send the exact same original request with the exception of the Transaction ID. The Transaction ID must be different so that if the responding station does respond, the requesting station can determine to which request it is responding.

Broadcast/Multicast Data Frames on DDVCC:

LAN Emulation requires that all broadcast and multicast frames be sent to the ELAN via the BUS (over a multicast send VCC). The Expert system 2 generates this alarm when it sees a broadcast or multicast frame on a data direct VCC (a violation of the LAN Emulation standard).

Configuration Fail, Insufficient Resources:

LAN Emulation communications are established and managed using a set of standard request and response control frames (such as Configure, Join, Register, Unregister, ARP, Flush, and Verify, among others). Either a Configure, Join, or Register request was made to a LAN Emulation entity that was unable to grant the request due to a lack of resources (for example, an inability to create new VCCs or a lack of cache table space).

Config Frag Info TLV Not Recognized By LECS:

During the Configuration phase of LAN Emulation communications, a LEC sends a Configure Request frame to the LECS in order to obtain configuration information, including the address of a LES for an ELAN that meets the LEC's needs. The Configure Request frame can optionally contain the Config Frag Info TLV. The Config Frag Info TLV tells the LECS that it can send TLV data to this LEC that will not fit into a single frame over multiple frames (that is, the LECS can fragment the TLV data). The Expert System 2 generates this alarm when the LECS sends a Configure Response frame with the Status field set to 24 (decimal), indicating that it does not recognize the Config Frag Info TLV sent by the LEC.

Configuration Request Multi Queued:

A LAN Emulation entity resent a Configure Request frame with the same Transaction ID as the Configure Request frame. This is a violation of the LAN: Emulation standard. LAN Emulation communications are established and managed using a set of standard request and response control frames (such as Configure, Join, Register, Unregister, ARP, Flush, and Verify, among others). Each of these requests has a Transaction ID field. When the station receiving the request returns its response, it preserves this Transaction ID. This way, the requesting station can tell which responses correspond to which of its requests (by matching the Transaction IDs). Whenever a LAN Emulation entity needs to resend a request (perhaps because there was no response), it must send the exact same original request with the exception of the Transaction ID. The Transaction ID must be different so that if the responding station does respond, the requesting station can determine to which request it is responding.

Configure Request Response Timeout:

A LEC sent a Configure Request frame to the LECS but did not receive a Configure Response frame before the timeout value specified by the C7 Control Time-out initial state parameter. The ATM Forum specifies a minimum value of 10 seconds for this timeout, with a default value of 30 seconds and a maximum of 300 seconds. The C7 Control Time-out is sent by the LEC as part of the Configure Request frame. The Expert watches for the timeout value and then uses it to measure the responses to the Configure Request.

Config Request Retry Frame Mismatch:

A LEC resent a Configure Request frame in which a field was changed other than the Transaction ID. This is a violation of the LAN Emulation standard. Whenever a LEC needs to resend a Configure Request frame (perhaps because there was no response from the LECS), it must send the exact same original request frame with the exception the Transaction ID. The Transaction ID must be different so that if the responding station does respond, the requesting station can determine to which request it is responding.

Config Request Retry Rate Exceeds 1 Hz

The Expert System 2 generates this alarm when it detects a LEC resending the same Configure Request frame more than once per second (that is, 1 Hz).

Control Request Response Timeout:

A LEC sent a Control Request frame to the LE Service, but did not receive a corresponding response frame before the timeout value expired. The Expert uses timeout values as follows:

The Expert system 2 uses the timeout value specified by the LEC's C7 Control Time-out initial state parameter if it has been able to learn it from network traffic. The C7 Control Time-out is sent by the LEC as part of the Configuration or Join phase of LAN Emulation communications. The ATM Forum specifies a minimum value of 10 seconds for this timeout, with a default value of 30 seconds and a maximum of 300 seconds.

If the Expert system 2 has not been able to learn the C7 Control Time-out parameter, it uses the Control Timeout C7 threshold in the Alarms tab of the Expert Properties dialog. By default, NAI sets this threshold to 30 seconds (the same default as the ATM Forum).

The exact type of Control Request frame resent could have been a Join Request, Register Request, Register Request, ARP Request, Flush Request, or a Verify Request. The alarm display will indicate the exact request type(s).

Control Request Retry Frame Mismatch:

A LEC resent a Control Request frame in which a field was changed other than the Transaction ID. This is a violation of the LAN Emulation standard. The exact type of Control Request frame could have been a Join Request, Register Request, Unregister Request, ARP Request, or a Verify Request. Whenever a LEC needs to resend a Control Request frame (perhaps because there was no response from the LE Service), it must send the exact same original request frame with the exception of the Transaction ID. The Transaction ID must be different so that if the responding station does respond, the requesting station can determine to which request it is responding.

Control Request Retry Rate Exceeds 1 Hz:

The Expert system 2 generates this alarm when it detects a LEC resending the same Control Request frame more than once per second (that is, 1 Hz). The exact type of Control Request frame resent could have been a Join Request, Register Request, Register Request, ARP Request, Flush Request, or a Verify Request.

Denied Access to ELAN:

A LEC sent either a Configure Request control frame or a Join Request control frame to the ELAN (Emulated LAN) and was denied access for security reasons.

Duplicate ATM Destination Address Registration:

A LEC attempted to register an ATM address with the LES that was already in the LES' cache of addresses. The registration attempt could be in either a Join Request message or a Registration Request message.

Duplicate LAN Destination Registration:

The Expert system 2 generates this alarm when it detects a Join Response or Register Response frame sent from the LES to the LEC with the Status Code 4 (decimal). This status code indicates that the LAN destination address that the LEC attempted to register with the LEC was already in the LES's cache of addresses.

Flush Request Multi Queued:

A LAN Emulation entity resent a Flush request with the same Transaction ID as the original Flush request. This is a violation of the LAN Emulation standard. LAN Emulation communications are established and managed using a set of standard request and response control frames (such as Configure, Join, Register, Unregister, ARP, Flush, and Verify, among others). Each of these requests has a Transaction ID field. When the station receiving the request returns its response, it preserves this Transaction ID. This way, the requesting station can tell which responses correspond to which of its requests (by matching the Transaction Ids). Whenever a LAN Emulation entity needs to resend a request (perhaps because there was no response), it must send the exact same original request with the exception of the Transaction ID. The Transaction ID must be different so that if the responding station does respond, the requesting station can determine to which request it is responding.

Insufficient Info from LEC, Service Refused:

A LEC sent a Configure Request frame to the LECS in order to be assigned to an ELAN. However, the LECS was unable to assign the LEC to an ELAN because the LEC did not provide sufficient information in its Configure Request frame.

Invalid Client ATM Primary Source Address:

The Expert system 2 generates this alarm when the LE Service (LAN Emulation Service) sends a control response frame with the Status field set to 10 (decimal), indicating that the source ATM address was invalid.

Invalid Client MAC Address:

The Expert system 2 generates this alarm when the LE Service sends a control response frame with the Status field set to 9 (decimal), indicating one of the following problems:

A LEC sent a Configure, Join, or Flush Request that indicated a multicast address in the SOURCE-LAN-DESTINATION field. This field is used to list unicast MAC addresses represented by the LEC. It is a violation of the LAN Emulation standard for multicast addresses to be listed there.

A LEC that indicated an ELAN type of 802.3\Ethernet sent a; Configure, Join, Register, ARP, or Flush Request with a Route Descriptor in the SOURCE-LAN-DESTINATION field. Route Descriptors are only used in 802.5\Token Ring ELANs.

A LEC sent an ARP Request to resolve multicast MAC addresses.

Invalid ATM Source Address:

The Expert system 2 generates this alarm when it sees a Control Request frame that is only supposed to be sent with the source address set to the LEC's primary source address (for example, a Join Request) sent with some other non-zero value.

Join Request Multi Queued:

A LAN Emulation entity resent a Join request with the same Transaction ID as the original Join request. This is a violation of the LAN Emulation standard. LAN Emulation communications are established and managed using a set of standard request and response control frames (such as Configure, Join, Register, Unregister, ARP, Flush, and Verify, among others). Each of these requests has a Transaction ID field. When the station receiving the request returns its response, it preserves this Transaction ID. This way, the requesting station can tell which responses correspond to which of its requests (by matching the Transaction IDs). Whenever a LAN Emulation entity needs to resend a request (perhaps because there was no response), it must send the exact same original request with the exception of the Transaction ID. The Transaction ID must be different so that if the responding station does respond, the requesting station can determine to which request it is responding.

Join Request Received from LES (LAN Emulation Server):

The Expert system 2 generates this alarm when a LEC receives a Join Request frame from the LES. This is the opposite of standard operating procedure in an ELAN. Join Request frames are ordinarily sent by the LEC to the LES to request that they be allowed to join the ELAN. The LES then responds to the LEC by sending the Join Response frame.

Join Request Transmitted by LES:

The Expert system 2 generates this alarm when a LES sends a Join Request frame to a LEC. This is the opposite of standard operating procedure in an ELAN. Join Request frames are ordinarily sent by the LEC to the LES to request that they be allowed to join the ELAN. The LES then responds to the. LEC by sending the Join Response frame.

Join Response Issued by LEC:

The Expert system 2 generates this alarm when a LEC sends a Join Response frame to the LES. This is the opposite of standard operating procedure in an ELAN. Join Response frames are ordinarily sent by the LES to the LEC in response to receiving the Join Request frame.

LANE Protocol Version Unsupported By ELAN:

A requesting station sent a control frame to the ELAN with a VERSION field indicating a higher value than that supported by the ELAN. Possible control frame types sent by the requesting station include Configure Request, Join Request, Register Request, Unregister Request, ARP Request, Flush Request, and Verify Request.

LEC Issued Config Response to LECS:

The Expert system 2 generates this alarm when a LEC sends a Configure Response frame to a LECS. This the opposite of standard operating procedure in an ELAN. Configure Response frames are ordinarily sent by the LECS to the LEC in response to receiving the Configure Request frame. They indicate whether the candidate LEC will be allowed to attempt the Join phase with a LES.

LEC Not Recognized By LECS:

During the Configuration phase of LAN Emulation communications, a LEC sends a Configure Request frame to the LECS in order to obtain configuration information, including the address of a LES for an ELAN that meets the LEC's needs. In response, the LECS sends the Configure Response frame indicating whether the candidate LEC will be allowed to attempt the Join phase with a LES. The Expert System 2 generates this alarm when the Configure Response frame sent from the LECS to the LEC indicates failure (that is, the LEC will not be allowed to attempt the Join phase) with a Status code of 20 (decimal). This status code indicates that the LEC is not recognized by the LECS.

LEC ID in Frame Does Not Match Client LEC ID:

The Expert system 2 generates this alarm when a LEC sends a Register, Unregister, or ARP request with the LECID field set to something other than the LEC's own ID.

LECID Is Not 0x0000 In Request Frame:

The Expert system 2 generates this alarm when a LEC sent a Register Request or a Join Request to the LE Service with the LECID field set to something other than zero. LAN Emulation requires that Register and Join requests be sent with the LECID field set to zero. This is because one of the purposes of the Register and Join phases of LAN Emulation communications is for the LEC to get its LECID from the LES.

LECS Issued Config Request to LES:

The Expert system 2 generates this alarm when a LECS sends a Configure Request frame to a LEC. This the opposite of standard operating procedure in an ELAN. Configure Request frames are ordinarily sent by the LEC to the LECS in order to obtain configuration information, including the address of a LES for an ELAN that meets the LEC's needs. In response, the LECS sends the Configure Response frame indicating whether the candidate LEC will be allowed to attempt the Join phase with a LES.

LE_CONFIGURE Parameter Conflict, Service Refused:

A LEC sends a Configure Request to the LECS in order to receive the address of the LES for an ELAN meeting its requested operating parameters. The Expert system 2 generates this alarm when the LECS receives the Configure Request from the LEC but refuses to assign the LEC to an ELAN due to a conflict in the parameters specified in the Configure Request frame.

Local Segment ID Not In Source Routed Frame:

The Expert system 2 generates this alarm when it sees a source routed frame with a route indicator (RI) field that does not contain a route descriptor (RD) matching the local ELAN's segment ID. Source routing is typically used in token ring (802.5) networks. Source routing use the RI field to identify each of the bridges that have forwarded a frame. As each bridge retransmits a frame, it appends its own RD to the RI field of the frame. As a result, the ultimate recipient has a record of all intermediate stations that forwarded the frame. Since LECs operate as bridges, they add their own RDs to the RI field. Frames seen on the network without an RD matching the local ELAN's segment ID are considered invalid. They may be discarded by a LEC.

MAC Address Bound To Multiple LECs:

The Expert system 2 generates this alarm when it sees the same LAN MAC address bound to multiple LECs.

Multiply Assigned Secondary LEC Address:

The Expert system 2 generates this alarm when it sees more than one LEC using the same secondary ATM address. A LEC can have multiple ATM addresses in addition to its primary ATM address. The primary ATM address is used for connections to the LES and BUS. It is used for all exchanges during the Configuration and Join phases of LANE communications. However, a LEC can also have secondary ATM addresses that can be used for Data Direct VCCs. ATM addresses are reported in the C1n variable for the LEC. The first address in the C1n variable is the primary ATM address, whereas the remaining addresses are considered secondary.

NARP Request Multi Queued:

A LAN Emulation entity resent a NARP request with the same Transaction ID as the original Join request. This is a violation of the LAN Emulation standard. LAN Emulation communications are established and managed using a set of standard request and response control frames (such as Configure, Join, Register, Unregister, ARP, Flush, and Verify, among others). Each of these requests has a Transaction ID field. When the station receiving the request returns its response, it preserves this Transaction ID. This way, the requesting station can tell which responses correspond to which of its requests (by matching the Transaction IDs). Whenever a LAN Emulation entity needs to resend a request (perhaps because there was no response), it must send the exact same original request with the exception of the Transaction ID. The Transaction ID must be different so that if the responding station does respond, the requesting station can determine to which request it is responding.

NARP Request Received from LES:

The Expert system 2 generates this alarm when a LES sends a NARP Request frame. This is the opposite of standard operating procedure in an ELAN. NARP Request frames are ordinarily sent by the LEC to inform the LE Service of changes in the bindings of remote addresses.

Request Parameters Are Incompatible With ELAN:

The Expert system 2 generates this alarm when the LE Service sends a control response frame with the Status field set to 2 (decimal), indicating that the parameters in a control request frame sent by a LEC were incompatible with the parameters supported by the ELAN.

Register Request Received from LES:

The Expert system 2 generates this alarm when a LES sends a Register Request frame to a LEC. This is the opposite of standard operating procedure in an ELAN. Register Request frames are ordinarily sent by the LEC to the LES in order to register a LAN destination \ATM address pair. The LES responds by sending the Register Response frame.

Register Response Issued by LEC:

The Expert system 2 generates this alarm when a LEC sends a Register Response frame to a LES. This is the opposite of standard operating procedure in an ELAN. Register Response frames are ordinarily sent by the LES to the LEC in response to receiving the Register Request frame.

Register. Request Multi Queued:

A LAN Emulation entity resent a Register request with the same Transaction ID as the original Register request. This is a violation of the LAN Emulation standard. A LAN Emulation communications are established and managed using a set of standard request and response control frames (such as. Configure, Join, Register, Unregister, ARP, Flush, and Verify, among others). Each of these requests has a Transaction ID field. When-the station receiving the request returns its response, it preserves this Transaction ID. In this manner, the requesting station can tell which responses correspond to which of its requests (by matching the Transaction Ids). Whenever a LAN Emulation entity needs to resend a request (perhaps because there was no response), it must send the exact same original request with the exception of the Transaction ID. The Transaction ID must be different so that if the responding station does respond, the requesting station can determine to which request it is responding.

Remote Address Issued by Non Proxy LEC:

The Expert system 2 generates this alarm when it detects a LEC with the C4 Proxy variable set to false responding to an ARP Request for a remote unicast MAC address not registered with the LES. The C4 Proxy variable indicates whether a LEC can have remote unicast MAC addresses listed in its C27 Remote Unicast MAC Address(es) variable.

TA List Resources Exhausted (Internal Eerror):

This is an internal alarm generated by the Expert system 2 when there is no longer enough buffer space to store an incoming Control Frame for Transaction checking.

Topology Change Request Multi Queued:

A LAN Emulation entity resent a Topology request with the same Transaction ID as the original Topology request. This is a violation of the LAN Emulation standard. LAN Emulation communications are established and managed using a set of standard request and response control frames (such as Configure, Join, Register, Unregister, ARP, Flush, and Verify, among others). Each of these requests has a Transaction ID field. When the station receiving the request returns its response, it preserves this Transaction ID. In this manner, the requesting station can tell which responses correspond to which of its requests (by matching the Transaction Ids). Whenever a LAN Emulation entity needs to resend a request (perhaps because there was no response), it must send the exact same original request with the exception of the Transaction ID. The Transaction ID must be different so that if the responding station does respond, the requesting station can determine to which request it is responding.

Topology Mismatch in Data Frame Types:

The Expert system 2 generates this alarm when it detects the following: An 802.3 frame was seen on a data direct VCC in an 802.5 ELAN.An 802.5 frame was seen on a data direct VCC in an 802.3 ELAN.

Unknown Marker/Protocol Values:

The Expert generates this alarm when it detects invalid values in a frame.

Unexpected TLVs Detected:

The Expert system 2 generates this alarm when it sees TLVs it does not expect in a frame. Each LAN Emulation control frame type supports a different subset of the total set of LANE TLVs. The Expert compares the TLVs seen in each detected control frame against the TLVs that are actually supported by that frame type. When an unsupported TLV is detected, the Expert generates this alarm. An example is provided in the Possible Cause section, below.

Unregister Request Multi Queued:

A LAN Emulation entity resent an Unregister request with the same Transaction ID as the original Unregister request. This is a violation of the LAN Emulation standard. LAN Emulation communications are established and managed using a set of standard request and response control frames (such as Configure, Join, Register, Unregister, ARP, Flush, and Verify, among others). Each of these requests has a Transaction ID field. When the station receiving the request returns its response, it preserves this Transaction ID. In this manner, the requesting station can tell which responses correspond to which of its requests (by matching the Transaction IDs). Whenever a LAN Emulation entity needs to resend a request (perhaps because there was no response), it must send the exact same original request with the exception of the Transaction ID. The Transaction ID must be different so that if the responding station does respond, the requesting station can determine to which request it is responding.

Unregister Request Received from LES:
   The Expert system 2 generates this alarm when a LES sends an Unregister Request frame to a LEC. This is the opposite of standard operating procedure in an ELAN. Unregister Request frames are ordinarily sent by the LEC to the LES in order to remove a registered LAN destination\ATM address pair from the LES' cache of registered addresses. The LES responds by sending the Unregister Response frame.

Unregister Response Issued by LEC:
   The Expert system 2 generates this alarm when a LEC sends an Unregister Response frame to a LES. This is the opposite of standard operating procedure in an ELAN. Unregister Response frames are ordinarily sent by the LES to the LEC in response to receiving the Unregister Request frame.

V2 LVs Issued in V1 ELAN:
   On a Version 1.0 ELAN, a control frame was seen with TLVs supported only in LANE Version 2.0.

Verify Request Multi Queued:
   A LAN Emulation entity resent a Verify request with the same Transaction ID as the original ARP request. This is a violation of the LAN Emulation standard.
   LAN Emulation communications are established and managed using a set of standard request and response control frames (such as Configure, Join, Register, Unregister, ARP, Flush, and Verify, among others). Each of these requests has a Transaction ID field. When the station receiving the request returns its response, it preserves this Transaction ID. In this manner, the requesting station can tell which responses correspond to which of its requests (by matching the Transaction IDs). Whenever a LAN Emulation entity needs to resend a request (perhaps because there was no response), it must send the exact same original request with the exception of the Transaction ID. The Transaction ID must be different so that if the responding station does respond, the requesting station can determine to which request it is responding.

Verify Request Received from LES:
   The Expert system 2 generates this alarm when a LES sends a Verify Request frame to a LEC. This is the opposite of standard operating procedure in an ELAN. Verify Request frames are ordinarily sent by the LEC to the LES in order to verify the ATM address of the BUS for the ELAN of which the LEC is a member. The LES responds by sending the Verify Response frame.

Verify Response Issued by LEC:
   The Expert system 2 generates this alarm when a LEC sends a Verify Response frame to a LES. This is the opposite of standard operating procedure in an ELAN. Verify Response frames are ordinarily sent by the LES to the LEC in response to receiving the Verify Request frame.

Cache ID Set to Zero in DLL Header Ext:
   The Expert system 2 generates this alarm when an Egress Cache Purge Request from an MPC fails to include the Cache ID in the DLL Header extension.

Control Request Response Timeout:
   The Expert system 2 generates this alarm when any of the MPOA control request frames does not receive a response according to the response retry rules outlined in section 4.3 and 4.4.6.1.4 of the MPOA specification.

DLL Header Extension not Found in Frame:
   The Expert system 2 generates this alarm when the DLL Header extension fails to be included in Resolution Reply or Egress Cache Purge Request frames.

Egress Cache Tag was not Issued:
   The Expert system 2 generates this alarm when the Egress Cache Tag extension is not present in the Resolution Request frame.

Failure Reported in Reply CIE:
   The Expert system 2 generates this alarm when the CIE code is non zero in a reply frame.

Invalid CIE Contents:
   The Expert system 2 generates this alarm when the CIE fields are not filled as defined in section 5.3 of the MPOA specification.

Invalid Fixed Header Contents:
   The Expert system 2 generates this alarm if any of the "fixed header" parameters in the control frame violates the bounds set forth in the MPOA spec.

Invalid Common Header Contents:
   The Expert system 2 generates this alarm if any of the "common header" parameters in the control frame violates the bounds set forth in the MPOA spec.

Keep Alive Lifetime Set to Zero:
   The Expert system 2 generates this alarm when the Keep Alive Lifetime value found in the Keep Alive Lifetime Extension contained in the Keep Alive frame is zero.

Keep Alive Sequence Failure:
   The Expert system 2 generates this alarm when the Keep Alive frames received by the MPC have a request ID that is non-increasing with each frame.

Max Transmission Unit Size Undefined:
   The Expert system 2 generates this alarm when the MTU value found in the CIE is not defined for Cache Imposition Request and Cache Imposition Reply frames.

Failed to Issue Resolution Request in Response to Trigger:
   The Expert system 2 generates this alarm when the MPC fails to issue an MPOA Resolution Request when initiated by the MPS (via a Trigger command).

Invalid MPOA MPS MAC Address Count in Device Type TLV:
   The Expert system 2 generates this alarm when a Device Type TLV (detected on a LANE control flow) indicates a non-zero MPS MAC address count for device types including Non MPOA (0) and MPC (2) or a zero address count for MPSMPC (3).

Failure Reported in Reply CIE:
   This alarm is generated when Client Information Element (CIE) error codes are detected in the control frames detected on the MPC to MPS (MPCMPS) control flows.

MPOA Error Frame Detected:
   The Expert system 2 generates this alarm when an MPOA control frame contains an ar$op.type value of 0×88 indicating some form of failure.

MPOA Capable LEC did not Issue Device Type TLV:
   Once a LEC has been configured as an MPOA device (MPC or MPS) it must include the Device Type TLV with every issuance of the LE_REGISTER REQUEST, LE_REGISTER_RESPONSE, LE_ARP_REQUEST, LE_ARP_RESPONSE, and Targetless LE_ARP_REQUEST.

Keep Alive Lifetime Set to Zero:
   This alarm is issued when the Keep Alive Lifetime value in the Keep Alive Extension issued by the MPS is set to zero. This is the time during which a keep alive message is considered valid.

Keep Alive Sequence Failure:
   This alarm is issued when the request ID found in the Keep Alive control frame does not sequentially increase with each instance of the Keep Alive frame.

No CIEs were Present in MPOA Reply:
   The Expert system 2 generates this alarm when MPOA response frames do not have a mandatory CIE element. This includes all control frame types with the exception of Trigger and Keep Alive frames.

No CIEs were Present in MPOA Request:

The Expert system 2 generates this alarm when MPOA request frames do not have a mandatory CIE element. This includes Cache Imposition Request, Egress Cache Purge Request and NHRP Ingress Cache Purge Request frames.

No EXTs were Present in MPOA Reply:

The Expert system 2 generates this alarm when MPOA response frames do not have mandatory EXT elements included in the frame. These frame types include Egress Cache Purge Reply.

No EXTs were Present in MPOA Request:

The Expert system 2 generates this alarm when MPOA request frames do not have mandatory EXT elements included in the frame. These frame types include Egress Cache purge Request and Keep-Alive.

No Reply Flag is not Set in ICache Purge:

The Expert system 2 generates this alarm when the No Reply flag is cleared in the Common Header Flags field of the NHRP Ingress Cache-Purge request detected on the shortcut flow (data plane purge).

Unknown/Unexpected CIE in frame:

The Expert system 2 generates this alarm when one or CIEs are detected in a control frame, which does not use the CIE elements including Keep-Alive and Error Indication frames.

Unexpected MPOA Control Frame:

The Expert system 2 generates this alarm when any control frame (except for NHRP Ingress Cache Purge Request) is detected on the MPCMPC shortcut flows.

Other Alarm Conditions:

Unexpected DLL Header EXT in frame;

Unexpected Egress Cache EXT in frame;

Unexpected Hop Count EXT in frame;

Unexpected Keep-alive Lifetime EXT in frame;

Unexpected Original Header EXT in frame;

Unexpected Service Category EXT in frame; and

Unknown/Unexpected Authentication EXT in frame;

These alarms are issued when EXT elements are included in requester reply frames when this is a violation of the MPOA specification.

Unknown Extension in frame:

The Expert system 2 generates this alarm when the extension Type found in the EXT header is undefined i.e. out of range 0×1000→0×1006.

Figure 21:
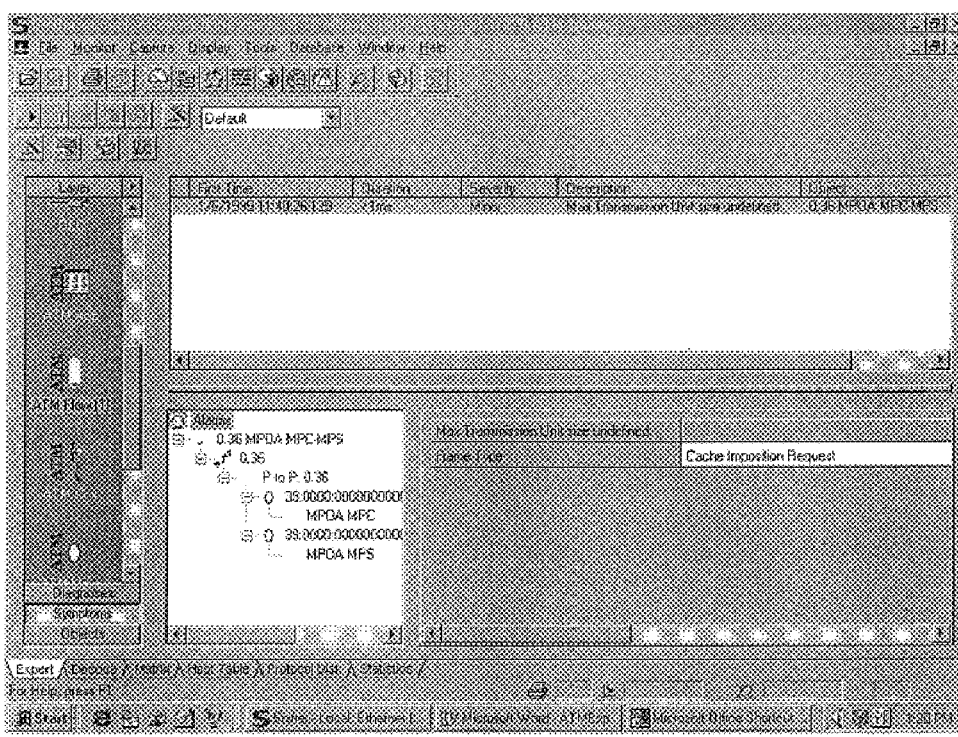

Example of Flow Layer Alarm:

FIG. 21 shows an example of a display provided in the present Sniffer Expert System 2 for showing a Flow Layer alarm.

C. Host Address Cannot Be Mux'ed Alarm Condition

The Expert generates this alarm if the host object is attached to a set of Sub Hosts that cannot share the same ATM host address, e.g. a LEC cannot be mux'ed with a BUS but can be mux'ed with an MPC or MPS.

Entry Into Sniffer Expert Application:

The above described operation assumes that the ATM Sniffer Application has been installed properly on a Win NT Pentium class computer, which has been configured with the required minimum amount of memory (128 Mbytes RAM 11, and 1 Gbyte hard drive), the Windows NT 4.0 operating system, and the NAI Sniffer ATM NIC 8.

Figure 22:
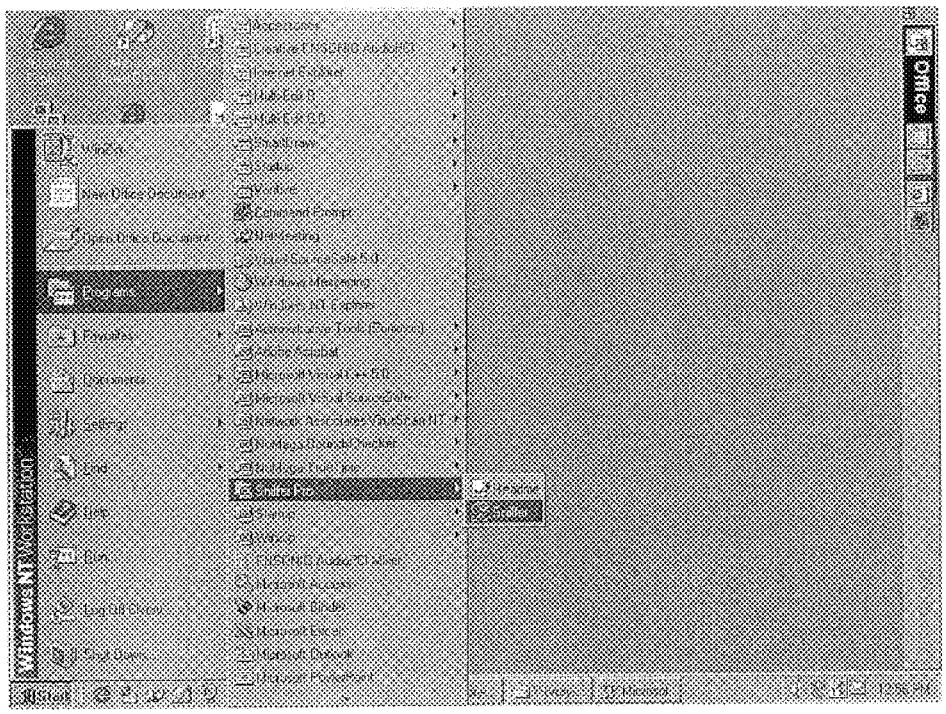
Figure 23:
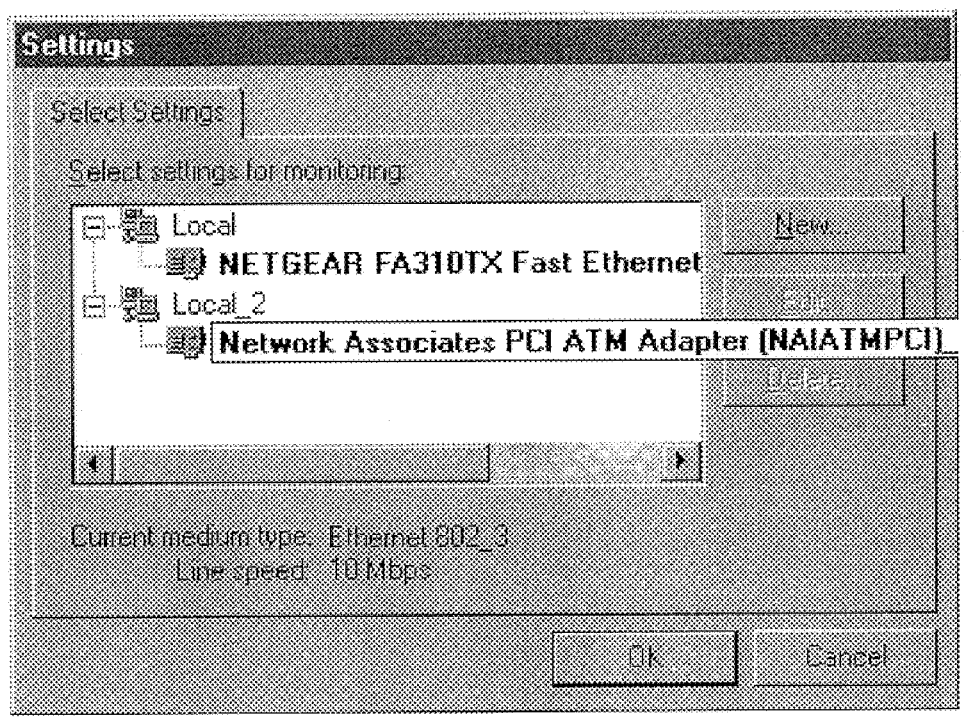

FIG. 22 shows startup of the ATM Sniffer application via the "start" menu of the Win NT interface. If this is the first time the Sniffer application has been-executed then the window shown in FIG. 23 will be displayed. This window enables the user to select one of several (if available) NICs (e.g. Ethernet, ATM) which correspond to the network type upon which the Sniffer Analyzer is attached. For the purpose of our discussion it will be assumed that the ATM NIC as shown is selected.

Figure 24:
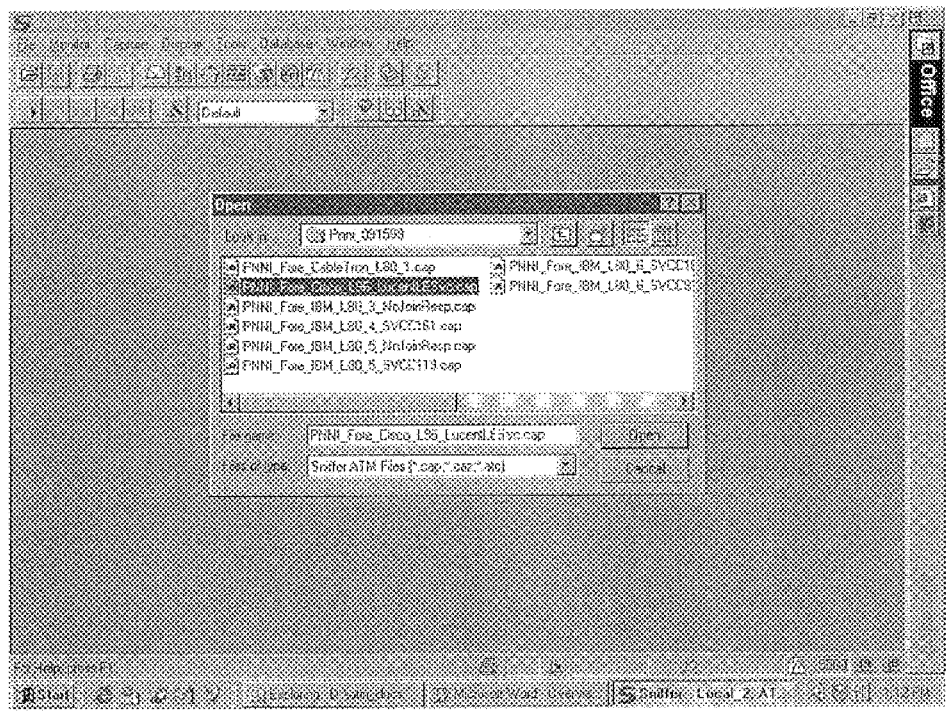
Figure 25:
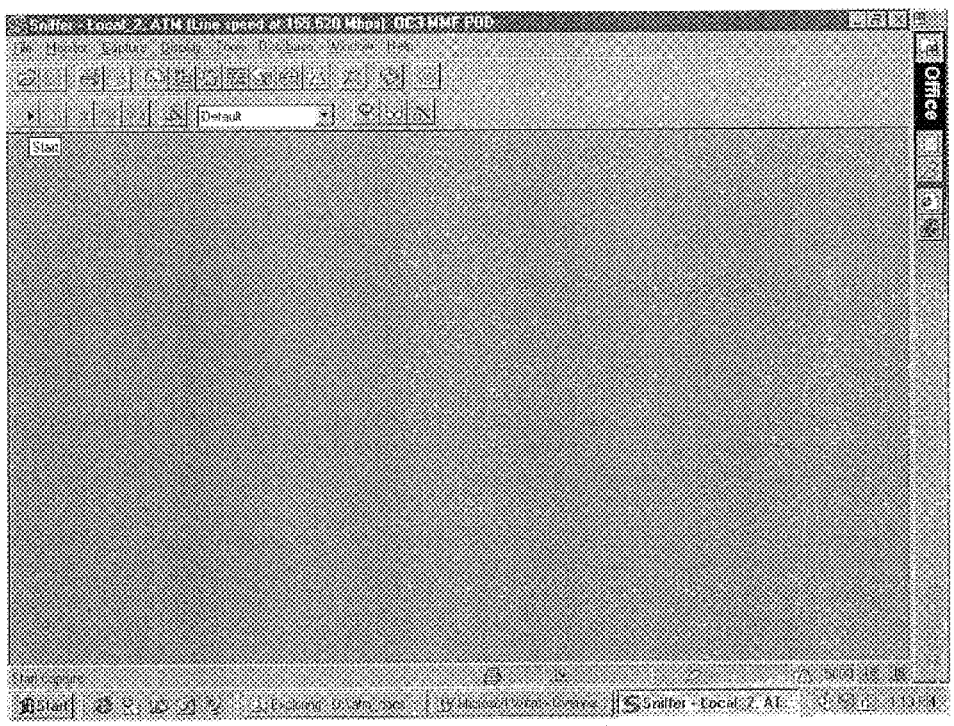

FIG. 24 shows the startup display for the Sniffer Analyzer.The user may select a trace file for "off line" analysis as shown in FIG. 24 or if the Sniffer is attached to a live ATM network, "live capture" may be selected by pressing function key F10 or "clicking" on the "capture" button icon (shown) in FIG. 25.

Figure 26:
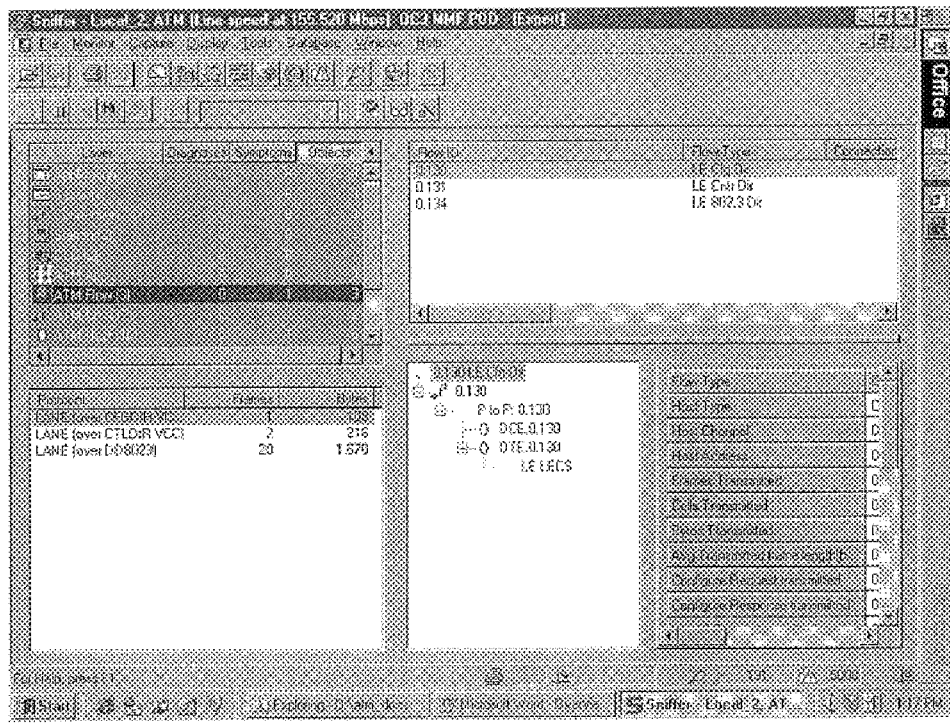

FIG. 26 shows a "live" capture session in action, note the ATM Expert display.

Although various embodiments of the invention have been shown and described, they are not meant to be limiting. Those of skill in the art may recognize certain modifications to these embodiments, which modifications are meant to be covered by the spirit and scope of the appended claims.

What is claimed is:

1. A method for analysis of a connection-oriented multiplexing and switching network (COMSN), comprising the steps of:

dividing a subsection of a COMSN network into a plurality of virtual channel characterization layers arranged between first and second pluralities of objects that may be communicating with one another, said plurality of virtual channel characterizations layers providing communication paths between said first and second pluralities of objects, and between various ones of said first pluralities of objects themselves, and of said second pluralities of objects, respectively;

extracting from said subsection frames when available over a period of time in each of said plurality of virtual channel characterization layers;

selectively displaying objects associated with said frames and the relationships between said objects, whereby said objects include a combination of host objects such as devices for gaining entry into said COMSN network, connections between the host objects, data and flows seen on the connection objects, and the number and type of flows originating or terminating at a selected one of said host objects.

2. The method of claim 1, wherein said extracting step further includes the steps of:

storing said frames in memory; and reading said frames from memory for creating the relationships between database objects associated with the frames.

3. The method of claim 1, wherein said COMSN network consists of an asynchronous transfer mode (ATM) network.

4. The method of claim 1, wherein said dividing step, said plurality of virtual channel characterization layers include four successive summary layers for display including:

an Application Layer including objects each representing a client or a server;

a Flow Layer holding statistical data or information relating to attached Flow objects, said Flow layer representing the flows or data paths which provide the bidirectional flow of data between said Flow objects and the objects attached to said Application layer;

a Connection Layer including a plurality of objects each of which represent a specific and distinct connection spanning two Host entities (point-to-point calls or point-to-multipoint calls), for all channels detected, including for each connection statistics, alarms and number of Sub Connections; and a Host Layer including all end stations residing on either side of a connection, each being designated as a Host object, said Host layer holding all statistics or data received or transmitted by each Host object.

5. The method of claim 4, wherein said plurality of virtual channel characterization layers further include:
a Sub Connection Layer including the binding of at least two Host objects to a given Connection Layer object, said Sub Connection Layer being used to hold statistics of all data passed between two Hosts.

6. The method of claim 5, wherein there is exactly one Sub Connection object for each Host pair.

7. The method of claim 6, wherein each Sub Connection Layer object is attached to a single Connection Layer object.

8. The method of claim 7, wherein a plurality of Sub Connection objects can be attached to the same Connection Layer object.

9. The method of claim 4, wherein said plurality of virtual channel characterization layers further include:
a Sub Host Layer including one or a plurality of Sub Host objects sharing a single Host Layer object.

10. The method of claim 9, wherein only one Host Layer object can be associated with a given Sub Host Layer object.

11. The method of claim 5, wherein said plurality of virtual channel characterization layers further includes:
a Sub Host Layer including one or a plurality of Sub Host objects sharing a single Host Layer object.

12. The method of claim 11, wherein only one Host Layer object can be associated with a given Sub Host Layer object.

13. The method of claim 3, wherein in said dividing step, said plurality of virtual channel characterization layers include four successive summary layers for display including:
an ATM Application layer including one or a plurality of objects each representing an ATM client or server that may not always be present;
an ATM Flow layer including one or a plurality of Flow objects, each Flow Object representing an individual unique ATM data stream associated with an ATM Connection, and may not always be present;
an ATM Connection Layer including one or a plurality of Connection Layer objects each representing an individual connection spanning either two ATM Host entities (point-to-point-calls), or a plurality of ATM Host entities (point-to-multipoint calls); and
an ATM Host Layer including a plurality of Host Layer objects, each Host Layer object representing an ATM Host or said station, all end stations residing on either side of a connection in said Host Layer.

14. The method of claim 13, further including:
a Sub Connection Layer including one or a plurality of Sub Connection Layer objects each of which represents the binding of two ATM Host objects to a given said Connection Layer object.

15. The method of claim 14, wherein there is exactly one Sub Connection object for each Host pair.

16. The method of claim 15, wherein each Sub Connection Layer object is attached to a single ATM Connection Layer object.

17. The method of claim 16, wherein a plurality of Sub Connection objects can be attached to the same ATM Connection Layer object.

18. The method of claim 14, further including a Sub Host layer including one or a plurality of Sub Host objects each of which represent a specific ATM Host entity, associated with an ATM Host Key/address.

19. The method of claim 18, wherein only one ATM Host Layer object is associated with a given Sub Host Layer object.

20. The method of claim 13, further including a Sub Host layer including one or a plurality of Sub Host objects, each of which represent a specific ATM Host entity associated with an ATM Host Key/address.

21. The method of claim 20, wherein only one ATM Host Layer object is associated with a given Sub Host layer object.

22. The method of claim 11, wherein said displaying step includes displaying a hierarchy tree showing all flows detected from associated data and control frames between said objects relative to said Application Layer, whereby the details of any flow; and attached station are found by traversing the hierarchy tree.

23. The method of claim 22, wherein said displaying step further includes displaying any alarms detected at the Application Layer.

24. The method of claim 22, wherein said displaying step further includes displaying all frame types detected at the Application Layer.

25. The method of claim 24, wherein said displaying step further includes via "drill down" to the Flow Layer a display of summary and object details contained at said Flow Layer for the detected flows, and for detected alarms.

26. The method of claim 25, wherein said displaying step further includes via "drill down" to said Connection Layer a display for a given connection including statistics, alarms, and number of Sub Connections attached to the given Connection of interest.

27. The method of claim 22, wherein said displaying step further includes via "drill down" to said Sub Connection Layer a display for a given Sub Connection of statistics specific to the Sub Connection including frame, cell, and byte counts.

28. The method of claim 27, wherein said displaying step further includes via "drill down" to said Host Layer a display of statistics, any alarms, and counts of Sub Hosts attached to said Host Layer.

29. The method of claim 28, wherein said displaying step further includes via "drill down" to said Sub Host Layer a display of statistics relative to a given Sub Host object at this Layer including frame, cell, and byte.

30. A method for displaying Asynchronous Transfer Mode (ATM) network analysis, comprising:
displaying a hierarchy tree showing a plurality of objects in a first window, wherein objects in a leftmost columnar position in the first window are at a same level in the hierarchy, and objects at successive lower levels are shown with an increasing rightward position as well as a lower position in the first window;
displaying a plurality of statistics associated with the objects in a second window; and
in response to a user selection of one of the objects via a mouse, affecting the statistics in the second window.

31. A method as set forth in claim 30, wherein the user is capable of drilling down the objects of the hierarchy tree.

32. A method as set forth in claim 30, wherein the user is capable of drilling up the objects of the hierarchy tree.

33. A method as set forth in claim 30, and further comprising displaying a plurality of mediums to be monitored during the network analysis in a third window for the selection thereof by the user.

34. A method as set forth in claim 30, and further comprising displaying a plurality of alarms in a third window for the selection thereof by the user.

35. A method as set forth in claim 30, wherein lengthy descriptions of the objects are occluded in the first window.

36. A method as set forth in claim 30, wherein the statistics include a number of bytes transmitted.

37. A method as set forth in claim 30, wherein the statistics include an average frame size transmitted.

38. A method as set forth in claim 30, wherein the statistics include a number of frames transmitted.

39. A method as set forth in claim 30, wherein an address associated with at least one of the objects is displayed.

40. A computer program product implemented by a computer readable medium for displaying Asynchronous Transfer Mode (ATM) network analysis, comprising:

computer code for displaying a hierarchy tree showing a plurality of objects in a first window, wherein objects in a leftmost columnar position in the first window are at a same level in the hierarchy, and objects at successive lower levels are shown with an increasing rightward position as well as a lower position in the first window;

computer code for displaying a plurality of statistics associated with the objects in a second window; and computer code for affecting the statistics in the second window in response to a user selection of one of the objects via a mouse.

41. A method for displaying Asynchronous Transfer Mode (ATM) network analysis, comprising:

displaying a hierarchy tree showing a plurality of objects in a first window, wherein objects in a leftmost columnar position in the first window are at a same level in the hierarchy, and objects at successive lower levels are shown with an increasing rightward position as well as a lower position in the first window;

displaying a plurality of statistics associated with the objects in a second window that is displayed simultaneously with the first window, wherein the statistics include a number of bytes transmitted in association with the objects, an average frame size transmitted in association with the objects, and a number of frames transmitted in association with the objects;

affecting the statistics in the second window, in response to a user selection of one of the objects via a mouse;

drilling down the objects of the hierarchy tree;

drilling up the objects of the hierarchy tree;

displaying a plurality of mediums to be monitored during the network analysis in a third window for the selection thereof by the user;

displaying a plurality of alarms in a fourth window for the selection thereof by the user; and displaying a plurality of files in a fifth window for the selection thereof by the user, each file including a plurality of objects capable of being displayed.

* * * * *